United States Patent
Chaturvedi

(10) Patent No.: US 10,210,664 B1
(45) Date of Patent: Feb. 19, 2019

(54) CAPTURE AND APPLY LIGHT INFORMATION FOR AUGMENTED REALITY

(71) Applicant: A9.com, Inc., Palo Alto, CA (US)

(72) Inventor: Rupa Chaturvedi, Menlo Park, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 15/586,038

(22) Filed: May 3, 2017

(51) Int. Cl.
*G06T 19/00* (2011.01)
*H04N 5/225* (2006.01)
*G06T 15/80* (2011.01)

(52) U.S. Cl.
CPC ............ *G06T 19/006* (2013.01); *G06T 15/80* (2013.01); *H04N 5/225* (2013.01)

(58) Field of Classification Search
CPC .......................... G06T 19/006; G06Q 30/0643
See application file for complete search history.

(56) References Cited

U.S. PATENT DOCUMENTS

| | | | | |
|---|---|---|---|---|
| 8,797,321 B1 * | 8/2014 | Bertolami | ............... | G06T 15/50 345/426 |
| 2002/0010734 A1 * | 1/2002 | Ebersole | ................. | H04L 29/06 709/201 |
| 2013/0194259 A1 * | 8/2013 | Bennett | ................. | G06T 19/006 345/420 |
| 2014/0125668 A1 * | 5/2014 | Steed | ...................... | G06T 15/50 345/426 |
| 2014/0132633 A1 * | 5/2014 | Fekete | .................... | G06T 11/60 345/634 |
| 2016/0104452 A1 * | 4/2016 | Guan | .................... | G06T 19/006 345/633 |

* cited by examiner

*Primary Examiner* — Jeffery A Brier
(74) *Attorney, Agent, or Firm* — Hogan Lovells US LLP

(57) ABSTRACT

Systems and methods herein enable adding changing light in a live camera view, an image or a video using a light source that is virtual and that includes an associated lighting profile. The system includes receiving image data of the live camera view. The system determines a first lighting profile associated with the representation of the object. Position information associated with the object is also determined with respect to the camera. The system receives a second lighting profile associated with the light source. The second lighting profile provides at least intensity values and direction information for light projected from the light source. The system determines and applies changes to the first lighting profile to affect a light surrounding the representation of the object using the second lighting profile. The system displays the image data with the changes to the first lighting profile.

20 Claims, 12 Drawing Sheets

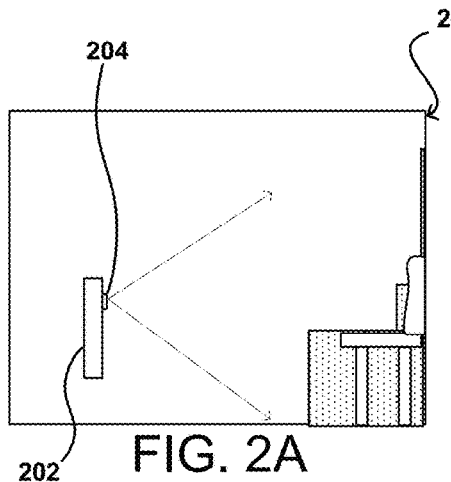
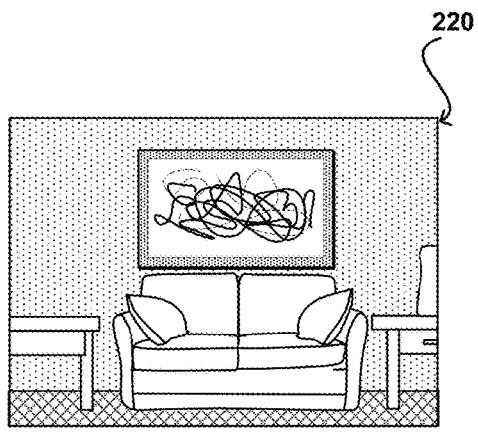
FIG. 2A
FIG. 2B
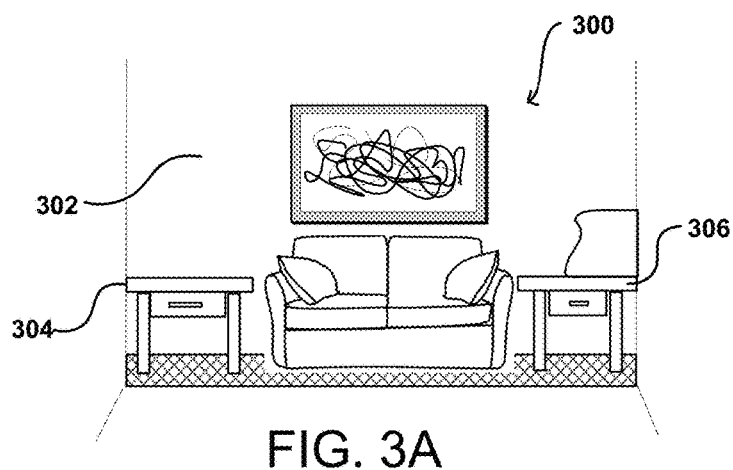
FIG. 3A
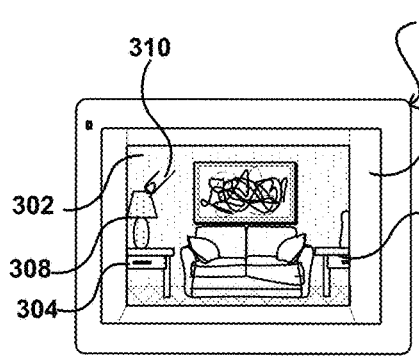
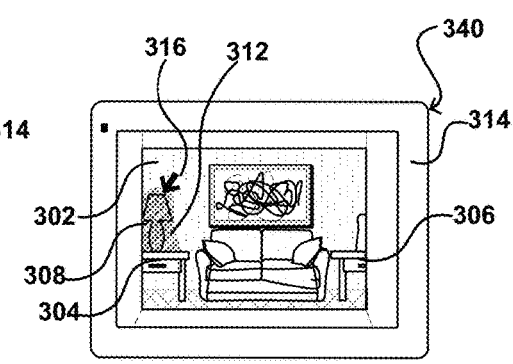
FIG. 3B
FIG. 3C

CAPTURE AND APPLY LIGHT INFORMATION FOR AUGMENTED REALITY

BACKGROUND

With the widespread use of computing devices, such as laptops, tablets, or smartphones, new and interesting approaches have arisen for enabling such devices to convey information to a user and vice versa. In an example, a graphical user interface (GUI) with windows, icons, and menus could be seen as improving a character user interface (CUI) because it provides a user with a more intuitive interface to a software application. The software application can perform functions in response to the user's intuitive inputs that are not from a code-base, for example. A CUI typically provides a code-based with instructions and syntaxes for the user to communicate with the software application or to instruct the software application to perform various functions. Moreover the time required to key instructions into a CUI is substantially more than the use of GUI icons.

More recently, with the advent of touchscreen and facial motion sensors, in more commercial settings than ever before, the touchscreen interface is more adapted to the GUI input than a CUI input. The most common functions, such as, scrolling and selecting is performed via touch or swipe gestures on the touchscreen than keyed input using scroll keys on a computer. Moreover, the GUI allows users to customize the software application interface much easier than the CUI. The constant evolution of touchscreen and GUI as a communication tool between the user and a machine also provides a more interactive experience to the user.

BRIEF DESCRIPTION OF THE DRAWINGS

The detailed description below is supported, in various embodiments, by the drawings accompanying this detailed description, and which is briefly described as follows.

FIGS. 2A-2B illustrate an example approach for providing a live camera view in accordance with an embodiment.

FIGS. 3A-3C illustrate an example approach for providing a light source and light information in a live camera view in accordance with an embodiment.

DETAILED DESCRIPTION

Figure 1A:
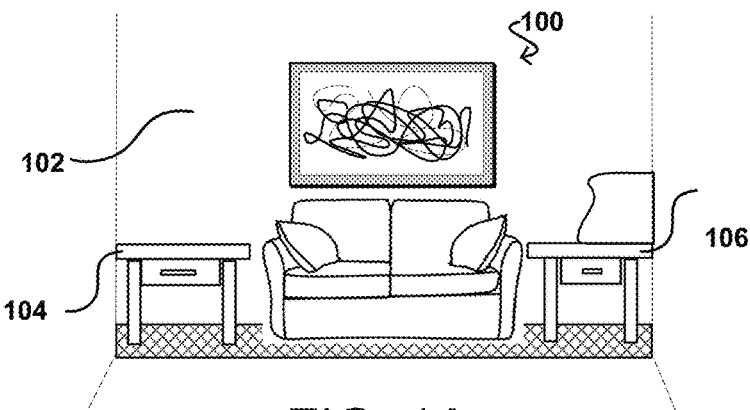
FIGS. 1A-1C illustrate an example approach for providing a light source in a live camera view in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the above-described deficiencies and other deficiencies in conventional approaches to displaying content in an electronic environment. In particular, various embodiments provide for augmenting a live camera view using light information from a virtual light or lighting source. For example, image data of a live camera view can be captured using a camera of a computing device. The image data can include, in an example, light information associated with a representation of an object. A representation of an object may be the live camera view capture of furniture and human subjects in a field of view of the camera. The light information can be analyzed to determine a first lighting profile associated with the representation of the object. Position information associated with the object with respect to the camera can be determined.

Once the first lighting profile and position information is determined, a second lighting profile associated with a light source can be received. The second lighting profile provides, in an example, at least intensity values and direction information for light projected from the light source. In various embodiments, the second lighting profile can be captured during a preprocessing at a prior time than the live camera view, and can be stored in a database. Changes to the first lighting profile to affect a light surrounding the representation of the object using the second lighting profile can be determined. The changes, in an example, can affect the light surrounding the representation of the object by changing a portion of the image data that relates to areas surrounding the representation of the object. In the above example augmented reality UI, an augmented reality view of the image data can be provided on the screen and can include the changes to the first lighting profile.

Accordingly, the systems and methods herein provide a richer experience in augmented reality or image/video modes on a screen, where additional representations of objects (e.g., tables and couches in photos or videos) to a captured view, image, or video is not merely a passive addition, but actively changes aspects of the representations of these objects. In an embodiment, the active changes can include changing a lighting surrounding one or more representations of objects using virtual lighting sources added to the captured view, image, or video. This process allows a user to preview, for example, effects from a virtual light source added into a live camera view, an image, or a video on a screen. Such a process is useful in electronic marketplace applications, where a user shopping for light sources, such as lights or bulbs, does not have contextual information as to how the light from these light sources interact with the physical area in which they are applied. The only possibility in the physical world is by trial and error using multiple light sources to determine the right choice.

Various other functions and advantages are described and suggested below in accordance with the various embodiments.

Figure 1B:
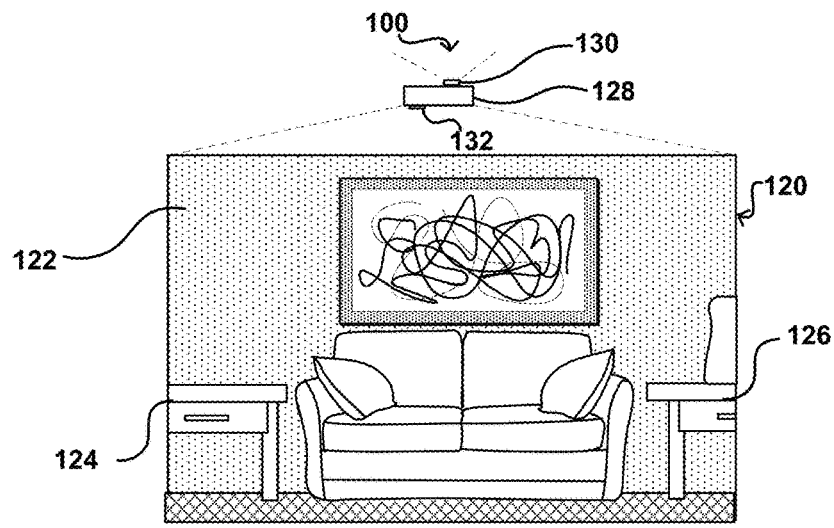
Figure 1C:
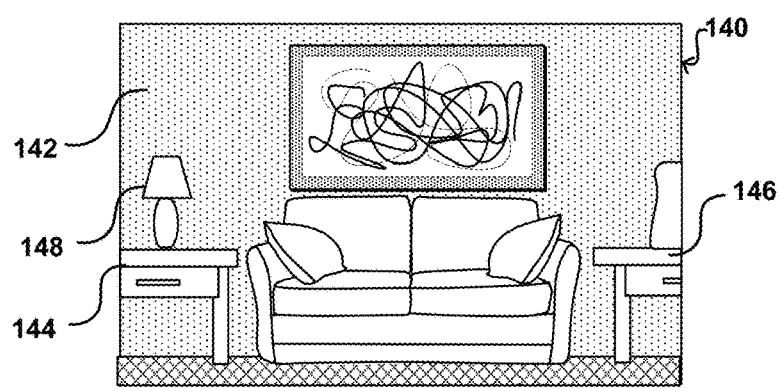

FIGS. 1A-1C illustrate an example approach for providing a light source in a live camera view in accordance with an embodiment. FIG. 1A provides a view or scene 100 for capture using a camera or any image capture element (e.g., reference numeral 130 of FIG. 1B) of a computing device (e.g., reference numeral 128 of FIG. 1B). The scene includes objects, such as tables 104, 106, a couch and a picture frame. Further, the scene includes ambient light, which is not seen, but referenced as reference numeral 102 for purposes of clarify in this disclosure. The ambient light 102 is typical from any existing light source in the view of scene—e.g., any fixed light, reflecting light, or sun exposure. FIG. 1B, in an example, provides a screen view 120, which is also a UI on a screen of the computing device 128. The screen view 120 includes a live camera view, image, or video of the view or scene 100 that the camera or image capture element 130 captures. For purposes of simplicity in this disclosure, an object is generally in reference to structures in a physical setting—e.g., tables 104, 106 in a scene or view 100. Representations of objects or, plainly, objects, as used in context of a screen view is generally in references to virtual structures or image data portions in a live camera view, an image, or a video—e.g., tables 124, 126, 144, and 146 in screen views 120, 140.

In implementations herein, representations of objects 124, 126 are presented as part of a screen view 120, which is a portion of a UI on a 2D screen. In other implementations, the screen view 120 may be the UI. For example, in augmented reality applications where a user is provided with overlay interface over the screen view, the screen view and UI appear synonymous. Accordingly, for simplicity, screen view is used interchangeably with UI, unless indicated otherwise. The representation of objects 124, 126—including furniture, art, living features (e.g., face features, etc.), are subject to tracking, in an example, to determine applicable animation or to render graphical changes to correspond to motion-based changes to these objects. The use of additional representations of objects to a live camera view, an image, or a video is a process that enables simulation of an immersive experience in three-dimension (3D) for the representation of objects via the 2D screen of an augmented realty UI.

Although a camera 130 is illustrated, and may be stand-alone, example implementations include the camera as part of a computing device 128 (e.g., a smart phone, tablet, or portable media player) that is described in other examples, throughout this disclosure, and that can be held in a user's hands. Other types of computing devices can utilize aspects of the various embodiments as should be apparent in light of the teachings and suggestions contained herein. The computing device 128 can include multiple cameras, one located towards the top of the device (e.g., reference numeral 132)—facing the user and the other towards the bottom of the device (e.g., reference numeral 130)—away from the user. Cameras on the same side of the computing device 128 are also available to include the system of the present disclosure and to perform the methods described herein. Furthermore, it should be understood that, while the camera of the example computing device 128 are shown to be on a "front" of the device, there can be similar or alternative components on the "top," "side," or "back" of the device as well (or instead).

Further, directions such as "bottom," "top," back," "side," and "front," are merely examples and not taken to mean specific orientations unless stated otherwise. Additionally, in an example, each of the cameras 130, 132 comprises a digital camera incorporating a complimentary metal-oxide-semiconductor (CMOS) image sensor. In another embodiment, a camera of the computing device incorporates other types of image sensors, including a charged couple device (CCD), and/or can incorporate multiple cameras, including at least one wide-angle optical element (e.g., fish eye lens), that enables the camera to capture images over a wide range of angles, such as 180 degrees or more. In embodiments herein, the computing device includes one or more additional cameras on the front, back, top, bottom, or sides of the computing device, and the one or more additional cameras can capture image data facing a front, back, top, bottom, or side surfaces of the computing device. Further, the example cameras comprise a digital still camera, configured to capture subsequent frames in rapid succession, or a video camera for capture video streams. A computing device, in another example, includes other types of imaging elements, such as ambient light sensors, IR sensors, other optical, imaging, lighting, or photon-type sensors.

In FIG. 1B, the UI or screen view 120 illustrates that there are no added light sources to the representation of objects; i.e., the screen view 120 of the physical view or the scene 100 is a faithful reproduction of the live camera view, image, or video frame from the physical view or scene 100. Indeed, the screen view 120 includes representation of the objects (e.g., tables 124 and 126 are partly representations of the physical tables 104, 106 within a focus/frame of the camera 130). Accordingly, the representations of objects, as used herein, are camera-captured versions of objects 104 and 106. The method and system herein, in an example, addresses the light surrounding each of these representations of the objects 124, 126, and any light interactions, such as reflections, etc. In the ambient lighting 122 situation, as in FIG. 1B, the screen view 120 is not illustrated to include any additional lighting than the expected ambient lighting 102 from what is existing in the scene or view 100 during a live camera view, image, or video (i.e., screen view 120) of the scene or view 100.

FIG. 1C illustrates a screen view with an added light source 148. In an example, the light source 148 is added as an augmented reality feature to the live camera view, image, or video in screen view 140. In the example of FIG. 1C, as the light source 148 is merely a light source without associated lighting profile, there is no change in the ambient lighting 142, which is similar to the ambient lighting 122 of FIG. 1B, for instance. There is also no change in the light surrounding the representation of the table 144. In the absence of the lighting profile for the light source 148, there is no immersive experience in the UI of FIG. 1C than mere positioning of the light source 148 to provide contextual information corresponding to interior decoration (i.e., positioning of tables 144, 146), for example. There is no additional information to provide a richer experience over FIG. 1B, for instance. The ambient lighting 142 of the UI or screen view 140 is unaffected with the addition of light source 148, compared to natural ambient lighting in the physical view or scene 100.

FIGS. 2A-2B illustrate an example approach for providing a live camera view in accordance with an embodiment. As in the case of FIGS. 1A-1C, FIG. 2A illustrates a side view of a computing device 202 (also, e.g., reference numerals 320 and 340 of FIGS. 3A-3B) and associated camera 204. The computing device 202, via camera 204, is illustrated as capturing the live camera view, the image, or the video (e.g., reference numeral 220) of a scene or view 200. It should be noted that although this example describes augmenting a light profile of a physical space represented in a live camera view with a light profile associated with a virtual lamp, such embodiments are not limited to the physical space. For example, the environment can include a virtual environment such as a game environment or other virtual reality environment. The light profile can include light information as described herein from one of a number of light sources, such as virtual sunlight, virtual artificial light, physical light sources, artificial (generated) light sources, among other such sources. In example implementations, approaches used for motion capture can be implemented for monitoring the change in location of specific features during user movement. For example, in some embodiments, the computing device 202 includes functions for 2D image capture using a distance sensor, range finders, ultrasonic transceiver, or other such device capable of providing distance information. In an embodiment, 3D or stereoscopic image data can be captured using multiple cameras instead of camera 204 or multiple image sensors within camera 204. The 3D or stereoscopic image data provides 3D point data, or disparity information that can be used to determine motion in 3D.

FIGS. 3A-3C illustrate an example approach for providing a light source and light information in a live camera view in accordance with an embodiment. FIG. 3A is a scene or view 300, similar to FIG. 1A. FIG. 3B illustrates a computing device 320 (e.g., the reference numeral 220 of FIG. 2A). The computing device includes screen 314 for providing a screen view (e.g., live camera view, image, or video) of scene or view 300. FIG. 3B also illustrates the use of user actions on the UI of the screen view. For example, when screen 314 is a touchscreen, a finger 310 is applicable to move objects into and out of the screen view. Finger 310 may be replaced by other input features, such as voice gestures, air gestures (hand gestures, wireless wand devices, wireless remote devices), touch based gestures to interface with the UI, touch based gestures using an object to the interface, movement data associated with the device or an input device, etc. In FIG. 3B, a light source, e.g., lamp 308, is movable using the touch interface into and out of the screen view. In FIG. 3C, a pointer 316 is available to move the lamp as in FIG. 3B; but the pointer 316 is controllable via a mouse, pen, IR remote, or any other input component, when the screen 314 is not a touch screen. Further, FIG. 3C also illustrates a preview image of the effects 312 of the lamp 308 on light surrounding table 304, for instance. Ambient lighting in FIG. 3B is unaffected in the absence of any effects from the light source 308, but FIG. 3C shows the effects 312 from the light profile associated with the lamp 308. In an example, when the light source 308 is moved using the finger 310 or pointer 316, the effects 312 follows the light source and changes light surrounding any object (e.g., table 306) near which the light source 308 is added.

In accordance with an embodiment, the effects 312 are determined from an analysis of two-dimensional (2D) image data captured during a live camera view, an image, or a video (e.g., screen views of FIGS. 3B-3C) of a scene or view 300. The analysis is to determine direction and motion information from the image data at the time of capture. For example, motion is determined using hardware components of the computing device 320, such as an accelerometer. The direction is in reference to the light direction for an object with respect to the camera of the computing device 320. For instance, the computing device 320 with the camera (e.g., camera 204 in FIG. 2A) utilizes structured lighting to obtain 3D image data. The structure lighting process includes projecting a regular pattern of light (e.g., infrared (IR) light) at a physical object (e.g., table 304) and analyzing the changes in the reflected pattern due to 3D nature of the physical object 304. The 2D and 3D image data, in an example, forms the basis of ambient lighting 302 available at a scene or view at the time of capture. When a user seeks to add additional lighting to the ambient lighting 302 of the scene or view, a light source 308, which is virtual and is associated with a light profile, is added to the captured live camera view, image, or video illustrated in FIGS. 3B-3C. The light profile 312 of the light source 308 then interacts with the 2D or 3D image data from the scene or view 302 and changes the light surrounding 312 representation of objects 304 in proximity to the added light source 308. The changes to the surrounding light may be by overlays or by changing the pixel properties in the surrounding areas as described throughout this disclosure.

In an example, a camera application on a computing device (e.g., reference numeral 320) displays various views of representations of an object 304, 306, when a user is viewing the object on the screen 314 during camera capture and when the computing device 320 in a first position. When the user tilts the computing device 320, different views of the objects 304, 306 are displayed based at least in part on the change in the relative position of the user with respect to the computing device. Further, the objects 304, 306 are presented with textural shading, shadowing, and/or reflections as captured by the camera. When the user adds a light source 308, the appearance of light 312 surrounding the representations of the objects 304, 306 are altered such that their textural shading, shadowing, and/or reflections correspond to of the inherent light profile of the added light source 308. The movement of the computing device 320, to provide different views or faces of the object 304, 306 also incorporates the changes to textural shading, shadowing, and/or reflections at the presented view or face of the representations of the object 304, 306. Such approaches provide an immersive experience of what a real life view captured as a live camera view (or image or video) would appear to a user with a virtual light source 308 that changes aspects of the representations of the objects 304, 306. Such approaches additionally provide an impression that the user is interacting with a 3D environment.

In a further example, a user may move the computing device 320/340 around and motion sensors in the computing device 320/340 sense the movement. Responsive to the movement, the motion sensors enable an augmented reality view, as a UI, where effects of the light source 308 are applied to the live camera view in FIG. 3C. Accordingly, even if a light source 308 is added, but outside the live camera view, the effects may extend to the appropriate neighboring portion of the live camera view as in the case of a physical light source in a physical environment. For example, even though the light source 308 is illustrated as added table 304 of screen view (representative of table 304 in the physical view or scene in FIG. 3A) and is visible, when the computing device 340 or the screen view is panned left or right, and the light source 308 is outside the field of view of the screen view, the effect of the light source is still visible by changing the light surrounding the representations of the objects 304—e.g., the table. Such implementation is detailed below, using a light profile associated with the light source and affecting the pixels in the area of the light surrounding the representations of the objects near the light source.

Further, in an example, a similar method from a scene or view capture to create light effect 312, as described above, is applicable to capture or build light profiles for lighting source 308. For example, the light profiles are obtained from a physical environment image capture of a physical light source associated with the virtual light source 308. Such a light profile, in an aspect, is obtained in one or more different physical ambient light situations for the light source 308. From this, an intensity model is built for each light source and is used to provide light intensities in various ambient lighting situations and angles for each of the corresponding light source. When the light source is added, as in FIG. 3B, the light profile associated with the light source 308, and stored in a database, is provided to overlay or to change the pixel properties of the surrounding areas of the added light source 308 and table 304, for instance.

The intensity model, in an example, has other uses as well. For example, a photographer can capture an image of an object. With a determination of the direction of lighting and, potentially, the intensity of the lighting, and/or other such aspects, a computing device can determine the location of various shadows or shading and can make adjustments accordingly. For example, the computing device is able to utilize an algorithm, such as the occlusion process previously explained, to remove shadows, highlights, glint, or otherwise adjust the brightness or contrast of portions of an image digitally based upon the relative location of the light source. In other embodiments, the computing device might apply a longer exposure or otherwise perform different capture approaches to areas in low light in order to obtain additional color information. In an example, the computing device can capture a portion of the image that is in the sun with a first set of optical settings and a second portion of the image that is not in the sun with a second set of optical settings. The information from the first portion of the image is stored as lighting profile and is useful to change the lighting in second portion of the image. Such a setting could be applied automatically for captured images to minimize or remove shadowing or decrease the variations in intensity, etc.

Figure 4:
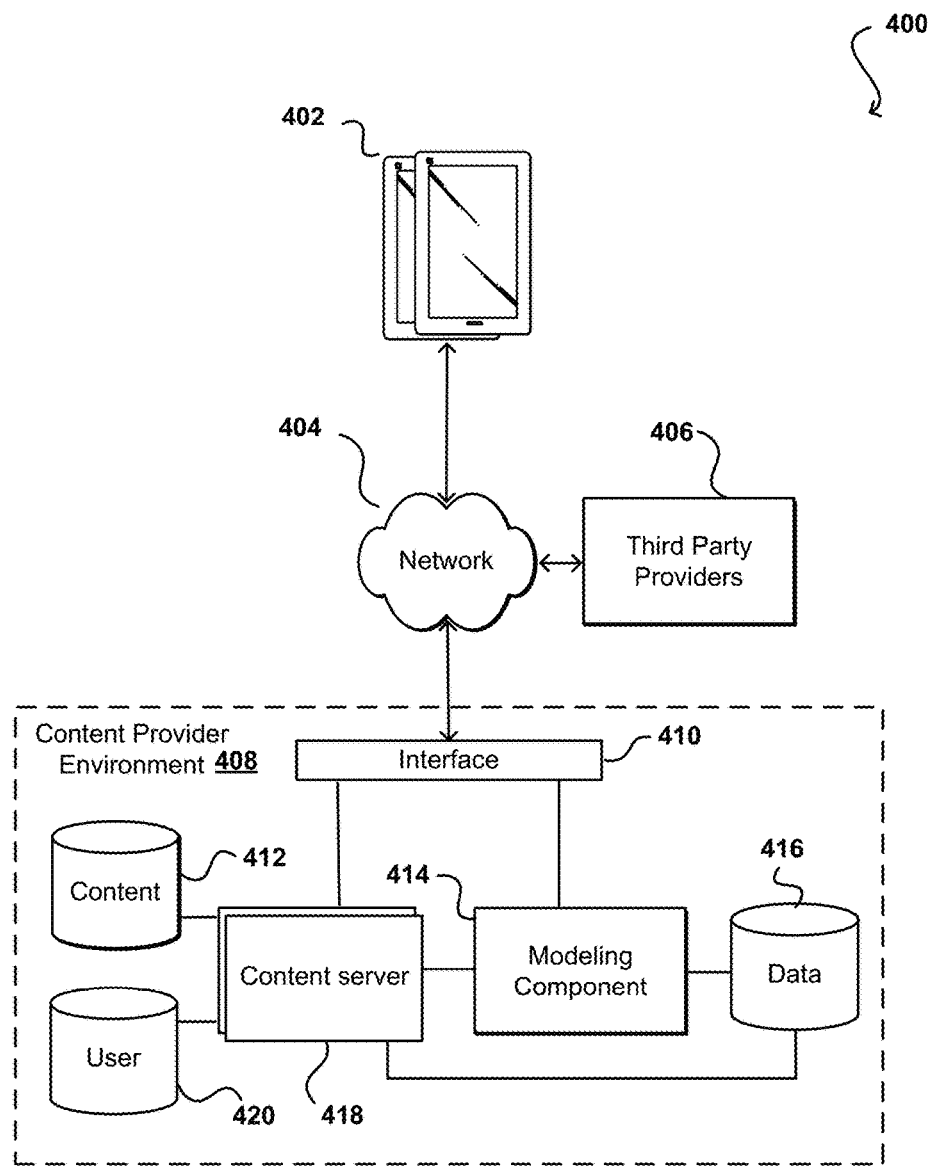
FIG. 4 illustrates an example network architecture with associated example components in accordance with various embodiments.

FIG. 4 illustrates an example network architecture 400 with associated example components 402-418 in accordance with various embodiments. In an example utilizing the network architecture 400, a computing device 402 includes a processor, a screen, a camera, and memory including instructions that the processor executes to perform processes described in this disclosure. An example process, content provider environment 408 receives a request to the content provider environment 408 for lighting content (e.g., one or more light sources for additional to a live camera view, image, or video). Such receipt of requests, in an example, is via network 404 and an interface layer 410 in the environment 408. As appreciated, for network environments, the interface layer 410 includes, in an example, components such as interfaces—e.g., Application Programming Interfaces (APIs), load balancers, request and/or data routers, and the like.

Further, an example implementation of FIG. 4, the request for lighting content is from an electronic marketplace application executing on the processor of the computing device 402. Example screen interfaces for such an electronic marketplace application is provided in more detail in subsequent discussion below. The request, in one example, is directed to one or more content servers 418, which can obtain the content from a content data store 412 or other such repository (including, for example, third party providers 406) to be sent back across the network(s) 404 to the requesting device 402. In an example, information for the request is also compared against user data in a user's data store 420 or other such location do determine, for example, whether a user has access rights to that content. In one example, the content can include various lighting items, for inclusion, as part of a virtual shopping environment (e.g., the electronic marketplace application) and may include a set of search results or set of potential lighting items, of interest, for adding and viewing within the UI or screen view providing the virtual shopping environment. Additionally, various other types of content or items can be utilized as well within the scope of the various embodiments—e.g., items providing reflection of ambient lighting for decorative purposes.

In example implementations, images of items, such as, lighting items, are manipulated and rendered with changes. Such an example includes, storing, modifying, and/or other processing of the lighting items to change the shade on the item or the intensity of the light bulb within the item. Such changes are performed, in an example, on one of the content servers 418 or using other such entity—including a third party provider (e.g., reference numeral 406). Such changes, for the content provider environment 408 are handled using the modeling component 414. An example modeling component 414 includes algorithms that mathematically extend or change a light profile in view of the changes a user makes to the lighting item. This is detailed further subsequently in this disclosure. In a further example, the content servers 418 are associated with an electronic marketplace (via an electronic marketplace application, for example, on a third party provider 406) or, generally, with a website from a third party provider 406. The content server 418 provide, in an example, the above changing or manipulation of the lighting of certain items. The virtual lighting items that are manipulated result in a change in their lighting profiles which is then saved and accessed from one or more of the content data store 416. Alternatively, the third party providers 406 include their own corresponding content data stores. In an embodiment, developer-based scripts, on an integrated development module, or other such application enables user manipulation of lighting content via an independent electronic marketplace application executed on the computing devices 402, and/or via an electronic marketplace application or website on a browser. In example embodiments, dedicated servers or other such components, services, or providers can manage the flow of gesture data and content between the various devices and locations.

In accordance with embodiments above and alternatively, when the request to provide a lighting option and/or other information is received, such as for the 3D model, information for the request is directed to modeling component 414. As previously noted, modeling component 414 uses algorithms to change lighting items in line with user requests, in an example; but such changes may correlate or use information from a user data store 420 (or other sources—e.g., user browsing history, a purchase history, or other such data) to generate the 3D lighting for the user. The 3D lighting model provides immersive experience in augmented reality when a user adds lighting to a screen view or UI and moves the screen view or UI to see effects of the added lighting in a different (e.g., third dimension) of the 2D screen. The use of virtually fit wearable items or watches on a user, to control the screen view or UI in the virtual environment, is also contemplated in this disclosure. Such a process would allow the use of the wearable item as an input to move the screen view or UI, instead of a touch screen, live camera view, or a mouse. The lighting content includes, in an example, a number of lighting options and related lighting profiles that are configured to change light surrounding objects in the screen view or UI.

In an embodiment, the user data store 420 includes profile information, such as the user's lighting preferences, style preferences, home photos, or any other user specific requirement that is applicable to more accurately describe the user's attributes. In an example, specific requirements include demographics-based preferences, gender, age, any web content that was previously browsed or accessed by the user, and advertisements or other content pertaining to user interest (e.g., through clicks, conversions, etc.).

Figure 5A:
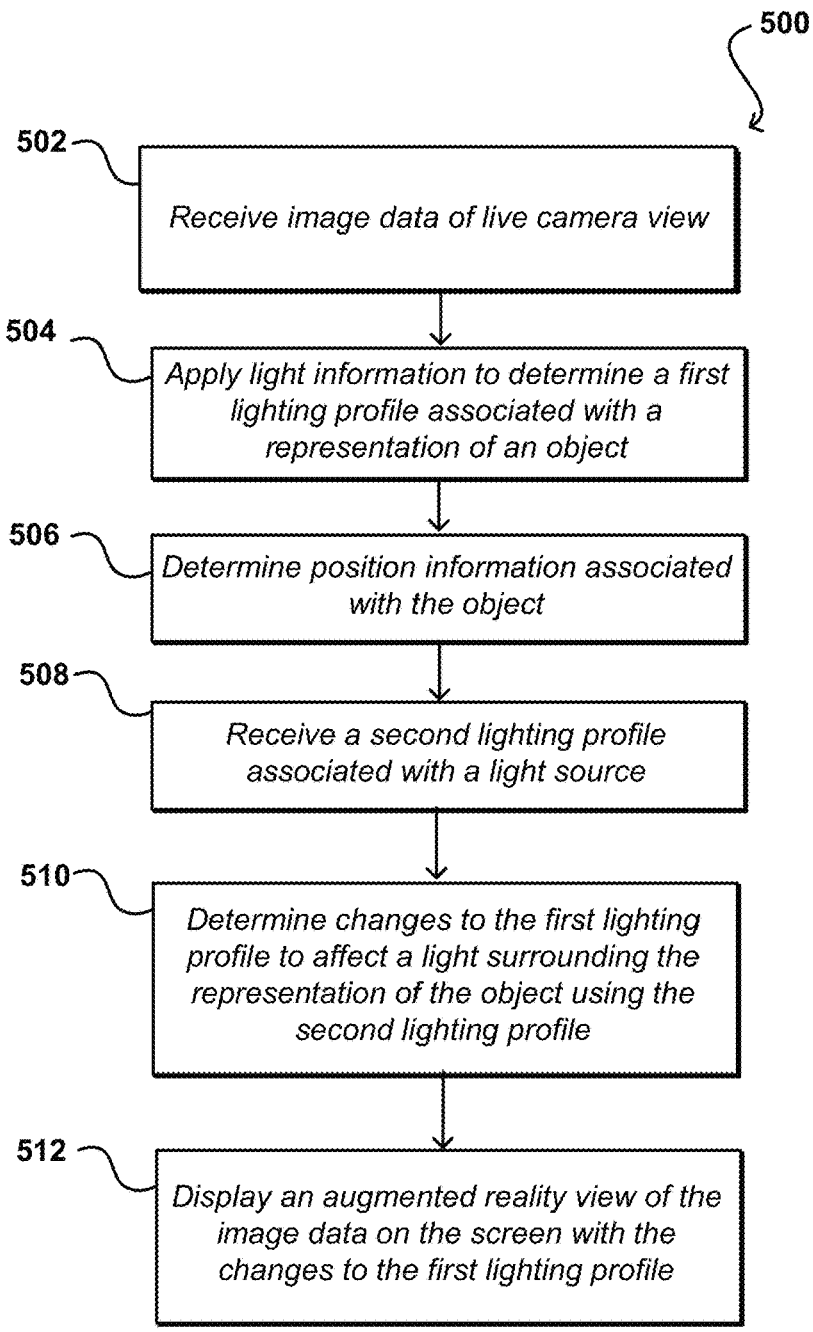
FIGS. 5A-5B illustrate example processes of providing a light source and light information in a live camera view in accordance with an embodiment.
Figure 5B:
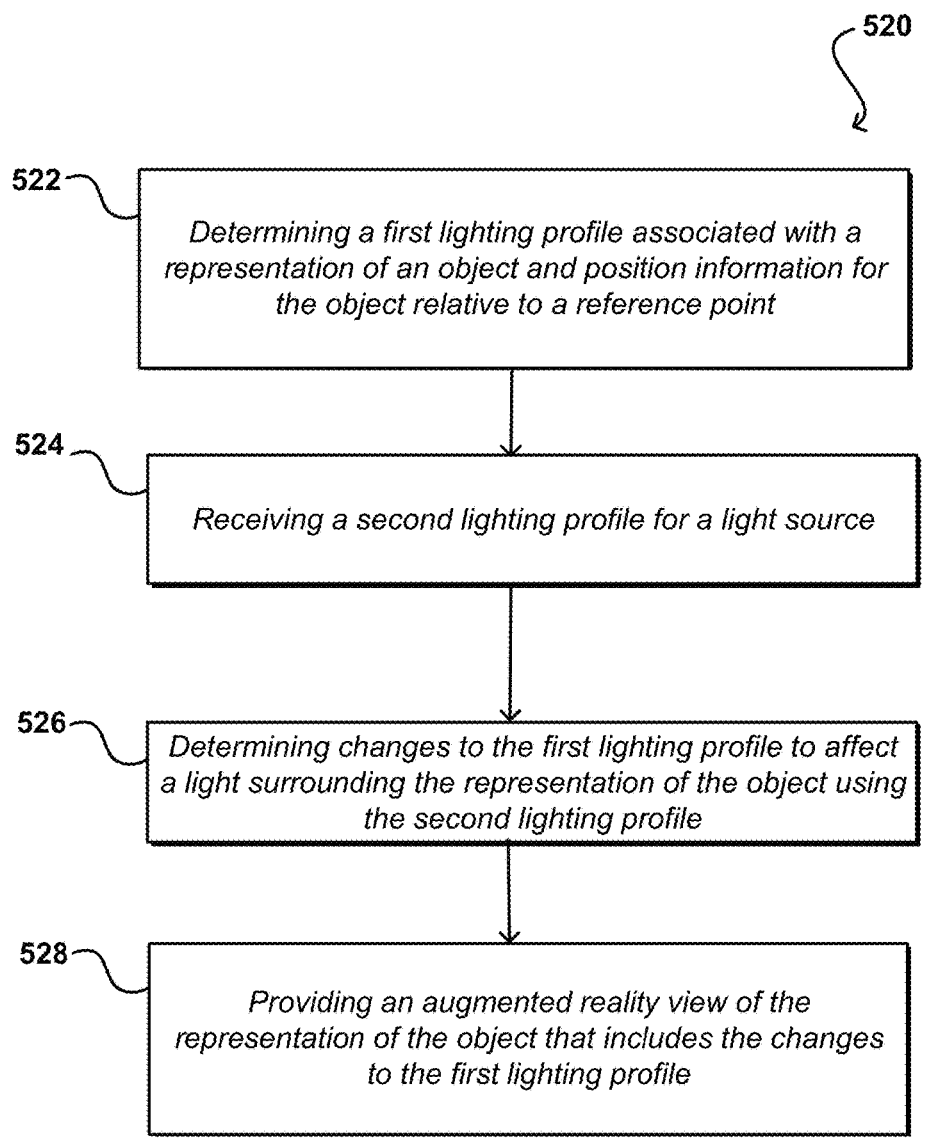

FIGS. 5A-5B illustrate example processes of providing a light source and light information in a live camera view in accordance with an embodiment. It should be understood that for this and other processes discussed herein that additional, fewer, or alternative steps can be performed in similar or alternative steps, or in parallel, within the scope of the various embodiments unless otherwise stated. For example, FIG. 5A is a flowchart 500 for an example method that uses a computing device, incorporating memory, a processor, and a camera, to perform one or more of the above embodiments. Sub-process 502, via the processor of the computing device, receives image data of a live camera view from the camera. The image data includes, in an example, light information associated with a representation of an object. A representation of an object may be the live camera view capture of furniture and human subjects in a field of view of the camera. Further, sub-process 504 of the example process includes applying the light information to determine a first lighting profile associated with the representation of the object. A sub-process 506, executing on the processor, determines position information associated with the object with respect to the camera. The memory also includes instructions that the processor executes to receive a second lighting profile associated with a light source. This is in block 508. The second lighting profile provides, in an example, at least intensity values and direction information for light projected from the light source. In a further example, the second lighting profile is captured at a prior time than the live camera view, and is stored in a database. Sub-process 510 is a second determining operation that determines changes to the first lighting profile to affect a light surrounding the representation of the object using the second lighting profile. The changes, in an example, affect the light surrounding the representation of the object by changing a portion of the image data that relates to areas surrounding the representation of the object. In sub-process 512, an augmented reality UI provides an augmented reality view of the image data on the screen. Further, the augmented reality view includes, in another example, the changes to the first lighting profile.

As in FIG. 5A, FIG. 5B is a flowchart 520 for another example method that uses a computing device, incorporating memory, a processor, and a camera, to perform one or more of the above embodiments. In sub-process 522, a determination sub-process applies for a first lighting profile associated with a representation of an object and position information for the object relative to a reference point. Sub-process 524 receives a second lighting profile for a light source. A second determination sub-process 526 determines changes to the first lighting profile to affect a light surrounding the representation of the object using the second lighting profile. In view of the above sub-processes of flowchart 520, sub-process 528 provides an augmented reality view of the representation of the object that includes the changes to the first lighting profile.

In addition to determining projection direction of one or more light sources for the second light profile, as in block 508 and 524, various approaches are applicable to determine a type of light source projecting light. Further, it is useful to determine the type of light source to be able to provide a light profile for the light source that accurately represents how the light source reacts with respect to an object to cast a shadow. Pertinently different light sources create different shadows when they interact with objects in an actual physical setting. To replicate such interactions in a virtual setting, the method and system herein provide examples of processes that are applicable to determine the type of light source as a point light source or non-point light source, in some instances. For example, a penumbral blur of a shadow cast on the sensor by an occlusion can be used to determine whether the light source is a point light source, such as a light emitting diode (LED) or a non-point light source, such as the sun. Penumbral blurring is primarily a function of two variables: the angular extent of the light source, and the distance between the casting object (in this description the occlusion) and the surface on which the shadow is cast. Penumbral blur increases as the light source is made larger or the occlusion object is moved away from the surface. With a determination of the penumbral blur of the occlusion shadow cast on an image or light sensor, a similar blurring can be applied to shadows rendered by the various virtual embodiments described herein.

In a further example process to accurately represent physical light interaction with objects for an augmented reality environment, detectable virtual shadows for the objects are provided into the live camera view, image, or video. In one instance, occlusion (or obfuscation) is utilized with an appropriate sensor (e.g., a light sensor) in order to generate a detectable virtual shadow. The occlusion can comprise, for example, an elongated bar, a paint marker, a plastic disc, a printed symbol or another other such element that can be positioned relative to a light sensor or other imaging element. As described throughout this disclosure, the relative position and/or separation of the occlusion with respect to the light sensor, is applicable to determine a vector calculation or other such process, and is also applicable to determine the approximate direction from which the light source is projecting (also referred to herein as the projection direction) based on the position of the shadow cast by the occlusion on the sensor.

In embodiments where the occlusion is selectively activated for shadowing as discussed above, and generally with respect to FIGS. 5A-5B, the image or light sensor may be configured to takes two successive images. One image is with the occlusion and the other is without the occlusion. The image with the occlusion can be used to determine the projection direction of the light source while the image without the occlusion can be used for rendering. In other embodiments, the occlusion may not be completely opaque, thereby improving the ability to reconstruct an image as the cast shadow also includes some information from the image itself. In such an embodiment, the opacity of the occlusion may be altered to determine the relative intensity of the light source, in addition to the projection direction. In other embodiments, the occlusion may only be opaque in one or more color, frequency, intensity and/or spectrum.

In addition to shading based on the determined projection direction of the light source, embodiments may also generate glint on the rendered objects based on the determined projection direction of the light source. In these embodiments, it may also determine the type of objection onto which glint is applied. For example, a computing device using the processes 500, 520 determines if the object, as captured, is a human eye, glass, metal, etc. and applies an appropriate level representation of glint to the representation of the object. In an example, glint is rendered on the lens of spectacles and glasses in a screen view, to further improve the realistic impression of the rendered object.

In an example use case of portions of the process 500, 520, the determination of positions of various light sources, relative to objects rendered by a computing device, is applicable in applications pertaining to removal of shadows from images that are captured by a device. Accordingly, the above processes for adding a light source is also applicable in instances to remove or adjust the lighting of a captured image, video, or live camera view. Such applications include removing shadowing to improve image quality, as well as assisting with processes such as face or object recognition and image analysis. For example, certain face or object recognition algorithms have difficulty identifying an object or a face if half of that object is covered in shadow. When a computing device performing the recognition has access to lighting information as discussed elsewhere herein, the computing device makes any necessary adjustments in order to improve the recognition process. For example, the computing device can attempt to remove the shadows or analyze based only on that portion that is in the light. In other embodiments, the computing device can attempt a "mirroring" process whereby any section that is likely covered in shadow can be replaced or merged with similar portions of the other side of that person's face in order to provide the points needed for proper recognition. In some embodiments, at least one front-facing camera can be used to attempt to recognize a current user of the device.

In an implementation for the above selective occlusion, a filter may be utilized for the occlusion such that it is opaque in blue color. Such a filter allows the light information, of an object in the green and red color, to pass through the occlusion to the sensor. The shadow cast in the blue color can be used to determine the projection direction while the information in the other colors can be used to render the image. In addition, by utilizing information in adjacent pixels, the blue color can be reconstructed for rendering. The pixel properties, in an example, is varied to include the changes to surrounding light after the addition of a light source in the image or live camera view. Various other approaches can be used as well within the scope of the various embodiments. It will be appreciated that occlusions may also be generated using any type of filter and not just a color filter. Filters in any light spectrum may be utilized to generate an occlusion that can be used to determine a projection direction of a light source.

In example embodiments using the process of FIGS. 5A-5B and the system throughout this disclosure, the occlusion can be turned on and off based upon the current mode of operation, orientation of the computing device or other such aspects. For example, if a camera is being used to take an image, the occlusion might be turned off. A camera on the other side of the computing device is used to determine lighting and shadows, and can continue to have the occlusion turned on. In other examples, the occlusion may be activated when an accelerometer or orientation element detects that the object in the camera view has moved a predetermined amount such that the projection direction of the surrounding light source(s) should be re-determined. In a gaming mode where everything is being rendered by the computing device, the occlusion might be activated for each sensor (e.g., camera). When the computing device is overlaying graphics over a captured video, the camera capturing the video might have the occlusion deactivated, while at least one other camera used for capturing lighting information might have the occlusion activated. While some occlusions might be activated by moving parts or other mechanical approaches, in some embodiments a number of pixels might be activated, such as in an electronic-ink type display, in order to provide an occlusion when needed. Various other such approaches can be utilized as well within the scope of the various embodiments.

In further implementations, an occlusion might not be needed to determine the shadow direction in the live camera view, image, or video. For example, when the computing device, e.g., reference numeral 202 of FIG. 2A has a button or indentation (e.g., a speaker area or recessed input), the button or the indentation will provide some indication of the projection direction of the incoming light based upon the shadows created by those features. When the computing device has one or more cameras (e.g., with wide-angle or fisheye lenses) that are able to image such a feature, the computing device can utilize those inputs to attempt to determine the projection direction of at least a primary light source. In some computing devices, a camera can attempt to analyze the shadow on a lip, edge or other such area around the periphery of the camera lens to attempt to detect a projection direction of incident light. Various other such components can be utilized as well for such purposes.

Figure 6A:
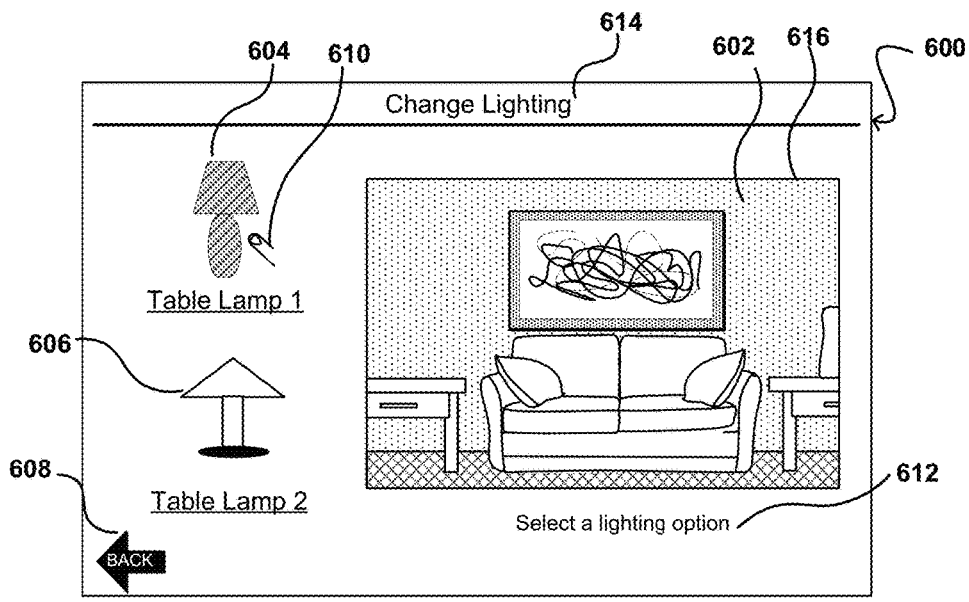
FIGS. 6A-6B, 7A-7B, 8A-8B, 9A-9B, and 10A-10B illustrate example interfaces of providing a light source and light information in a live camera view in accordance with an embodiment.

FIGS. 6A-6B, 7A-7B, 8A-8B, 9A-9B, and 10A-10B illustrate example interfaces for providing a light source and light information in a live camera view in accordance with an embodiment. In one implementation, as FIG. 6A illustrates, a screen view of a sequence of images, a video frame, or a live camera view 600 is captured via a camera, as in the camera embodiments previously discussed. In further example embodiments, software (e.g., user application, software library, operating system) executing on a computing device that incorporates the camera is applicable to determine the position, orientation, and other related information of an object within the screen view 600. Such information is obtained in 3D space, in one example. The position, orientation, and location (relative or fixed) is determined using various sensors and associated algorithms on the computing device. In an example, GPS® or other triangulation methods, and Global System for Mobile Communication (GSM®) are applicable technologies incorporated in the computing device of the present embodiments for determining location, position, and/or orientation information for an object in the camera frame.

In an example embodiment, 2D image data is captured to determine certain direction and motion information using the camera and the computing device utilizes structured lighting to obtain 3D information. A structured lighting example includes projecting a regular pattern of light (e.g., IR light) to the objects and analyzing the changes in the reflected pattern due to the 3D features of the objects. In another embodiment, motion capture methods are applicable for monitoring a change in surroundings or of specific features around objects due to the ambient environment. In a further example implementation, 2D image capture is enhanced using distance sensors, range finders, ultrasonic transceiver, or other such components that are configured of providing distance information. In yet another implementation, 3D or stereoscopic image information is captured using multiple cameras to provide 3D point data. Alternatively, the 3D or stereoscopic image information provides disparity information that is applicable to determine motion in 3D. Other approaches are contemplated and are readily apparent to one of ordinary skill in the art in light of the teachings and suggestions contained herein.

In the example implementation, the UI 600 is a camera-based capture from a physical view or scene. The UI 600 is, in an example, an electronic marketplace application that is independent of a browser or a similar implementation on a browser. The UI 600 includes at least a full screen view or a section view of the camera-based capture, e.g., reference numeral 616. The UI is an interface 614 to change lighting options to the view or scene as captured in the screen or section view 616. The UI includes a section 612 which may be clickable or informative. In the implementation of FIG. 6A, the information in section 612 indicates to a user to select a lighting option. Table Lamp 1 604 and Table Lamp 2 606 are illustrative options. The lighting options 604,606 are representations of lighting objects from prior captured information of the physical objects, in one example. In another example, the lighting options 604, 606 are virtually created using the structure lighting process. A person of ordinary skill would recognize from the present disclosure that additional lighting options may be provided off-screen and that may be brought on-screen, in the UI 600, using a scroll menu or swipe actions, from left to right, if the user rejects one of the options 604, 606. In the example interface UI 600, representations of objects in the screen view 622 are the tables, the couch, and the painting. Ambient lighting 602 is provided as representative of the captured ambient light from the scene or view in frame or focus of the camera. An option to go back to the electronic marketplace application home page or home screen is available using the clickable item 608. UI 600 is either touchscreen (illustrated in the example finger 610 for selecting Table Lamp 1 604) or may use an indicator as illustrated in feature 316 of FIG. 3C.

Figure 6B:
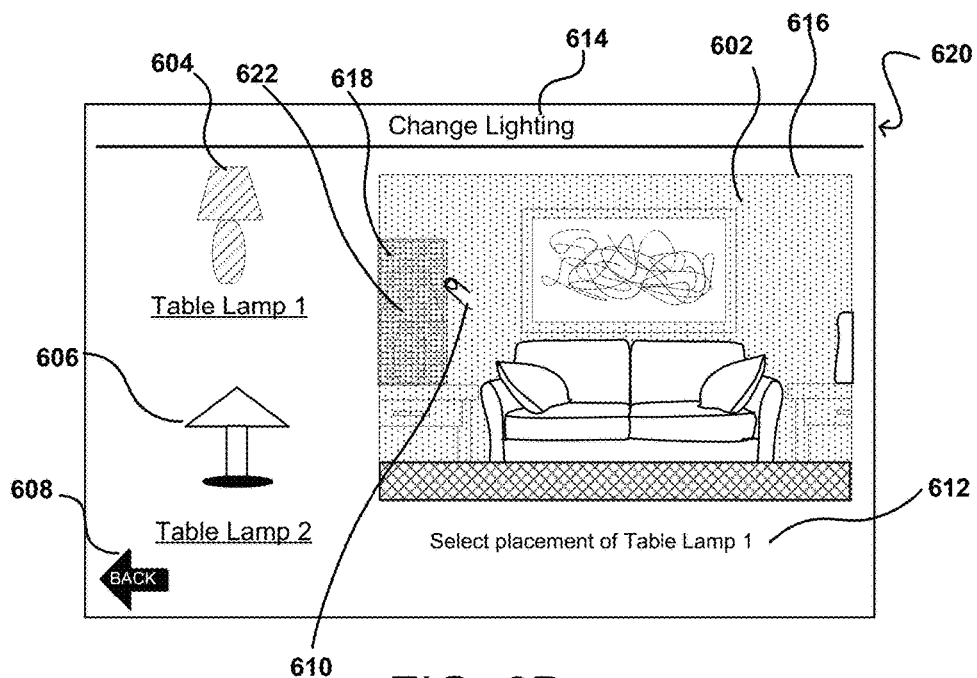

In an example, the UI 600 includes functions that partly rely on object tracking using various algorithms, sensors, and other input components (e.g., the camera, inertial sensors, motion sensors, etc.), as well as, applying corrections due to hand tremor from the user holding the computing device incorporating the features of FIGS. 6A-6B. Additionally, the present system and method provides, using the lighting information from the light source 622, a process to reduce errors due to variations in appearance of objects (e.g., table, chair, furniture, etc.) in a scene or view. Other factors, such as camera metrics, illumination conditions, and occlusion can also affect the information provided by the addition of the light source as a representation of an object (e.g., lamp) 622 to the screen view 616 that already includes other representations of other objects (e.g., table, chair, furniture, etc.).

Once a user selects a lighting option 612, FIG. 6B illustrates subsequent options to select placement of the Table Lamp 1 612. Indeed, a person of ordinary skill would recognize that embodiments and sub-processes herein are applicable in different order of steps or in different combinations than expressly disclosed, but will still provide the same benefits recited throughout this disclosure. The Table Lamp 1 604 is illustrated as selected with a change in color, a highlight, or a virtual box over the lamp. Table Lamp 2 606, in contrast, remains without change in color, highlight, or the virtual box, for being unselected, as illustrated. The informative or clickable section 612 provides instruction to the user for placement of the lamp 622, while a highlighting or virtual box of any kind 618 is provided over the lamp 622 to indicate that it is movable.

Figure 7A:
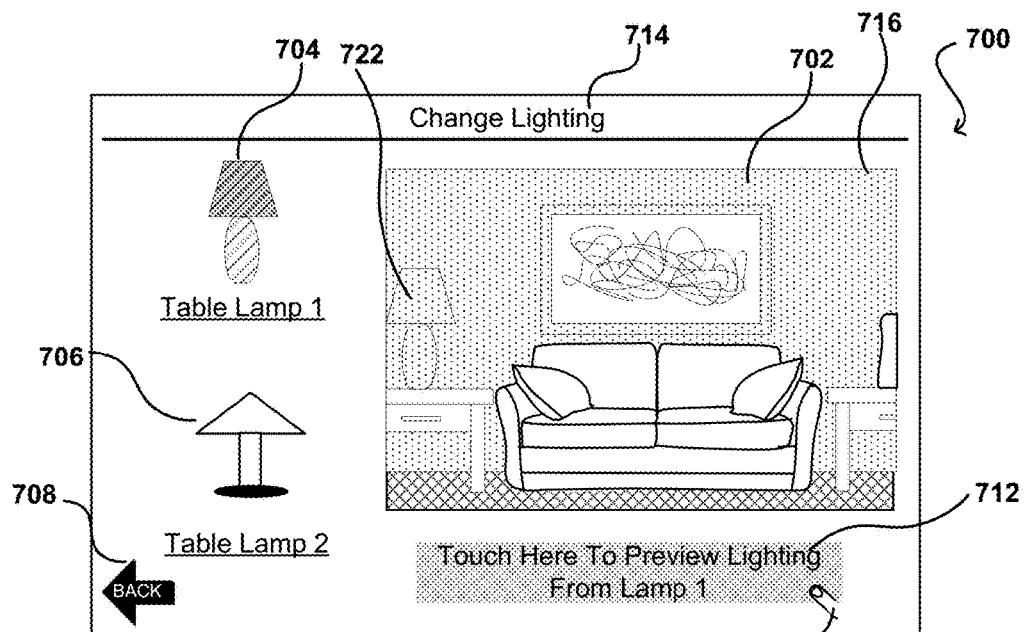
Figure 7B:
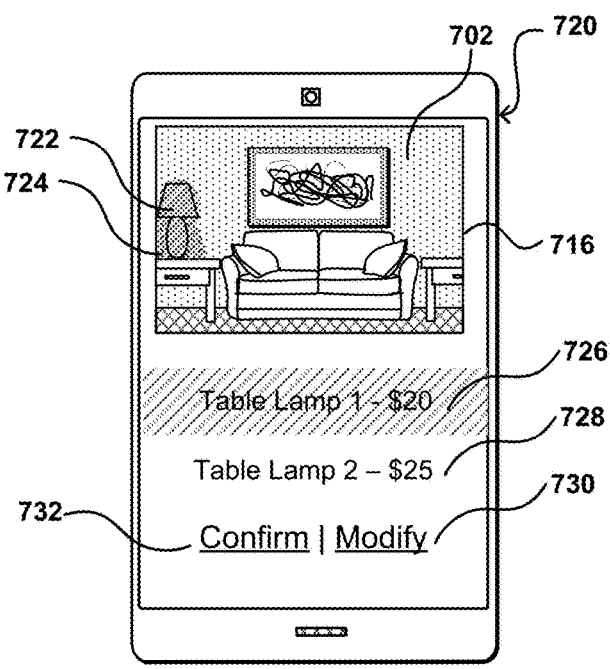

FIG. 7A illustrates an example UI 700 when the user has stopped moving lamp 722 and, so, the virtual box indicating movable representation of the object (i.e., lamp 722) is removed. The UI is an interface 714 that can maintain the same or an alternate title after each user action to provide context. The Table Lamp 1 704 is shown highlighted outside the screen view 722, while the unselected Table Lamp 2 706 remains without highlighting. A selectable back option 708 provides the user with an option to go back to selecting the placement of the lamp 722 (as in UI 620 and its corresponding discussion), and further back to selecting from lamps 704, 706 (as in UI 600 and its corresponding discussion). Once the lamp 722 is positioned, the informative or clickable section 712 provides a clickable option to preview lighting from lamp 1. Indeed, in another example option, the preview lighting from lamp 1 is automatically provided once the lamp 722 is positioned. FIG. 7B illustrates, on a mobile device 720, an example UI 716 providing the preview lighting 724 from lamp 1 722. Further, the user can recognize the difference in the preview lighting 724 as against the ambient lighting 702. The cost of the lamps appears, in an example, in informative or clickable sections 726, 728. The user may select from either informative or clickable section 726, 728, where FIG. 7B illustrates, via highlight, the selection of Table Lamp 1 for purchase. The UI provides the option to confirm or modify aspects of the selection via informative or clickable sections 732,730.

Accordingly, the examples of FIGS. 6A-6B and 7A-7B provide an illusion that the user is interacting with a real life lighting option in a physical scene or view that the screen views 616, 716 mimic. This is an immersive 3D environment to enhance the user's experience. Accordingly, in the example embodiment of FIG. 7B, the impression of 3D in the screen view 722 is augmented using lighting and associated shadowing of the light source 722 that is either virtual or a prior light source captured at a prior time. Moreover, such lighting and shadowing is from stored lighting profile associated with the light source 722. For example, each light source—lamps 704, 706 include corresponding lighting profiles which are specific to each lamp. Furthermore, a user may modify the lighting profiles, which are then stored as discussed with respect to FIG. 4. The lighting profiles also provide lighting and associated shadowing corresponding to the user's viewing angle when the screen view 716 is a live camera view and of a video or a 3D-image, for example. The lighting and shadowing, when previewed 712 in the screen view 716 affect corresponding lighting and shadowing of light surrounding at least an object in proximity to the light source. For example, the light surrounding the table over which the lamp 722 sits changes. In an example implementation, as the user moves his head and/or the device, the shadows over or of the table are redrawn or rendered relative to the light source 722. Alternatively, or in addition, textural shades and/or reflections of the table and the overlying light source 722 change in accordance with the position of the user's head.

In a further example, a computing device of the embodiments herein can generate shadows on graphical elements or 3D representations of objects. The shadows are based at least in part upon the change in position and orientation of the user or the computing device, as would be consistent for the current user viewing angle. Accordingly, the lighting from a light source, e.g., lamp 722, while adding light to an area facing the light source, e.g., the left table in FIG. 7B, also includes shadowing to an area extending from under the left table. The shadowing here is further exemplified, in an example, using the position or orientation of the user or the computing device 720 while previewing the added light source in the screen view 716. The ability to adjust shadowing with the changes in display in a realistic way can help to enhance the user experience, and can also help the user to better understand the direction and/or texture of, for example, a 2D representation of a 3D light source.

In a further example to enhance the user experience, when rendering a representation of an object for display as the live camera view, the image, or the video on a screen on the computing device 720, ambient light sources emitting light onto the computing device (external to the computing device at the time of rendering) can be augmented using a light source that is virtual and that changes the light and/or shade of representations of the object in the screen view 716. Such a process provides a displayed image that includes virtual light from a virtual light source (in addition to the added light source 722) and, therefore, provides a more realistic screen view to the user. Accordingly, the live camera view, the image, or the video of the object includes lighting and/or shading (or shadowing) that is virtually the same as if the object was being illuminated by an actual light source in addition to an actual lamp, at an actual virtual location.

There are additional implementations for the above system and process for providing additional virtual lighting and related shading effects from an actual ambient lighting on an image—at the time of screen view of the image (after capturing the image, for example). In one aspect utilizing the above process, when an image of a ball is captured and rendered on a user's tablet computer and when ambient light sources exist on the table computer at the time of viewing, a virtual light source may be added to include more light on the ambient lighting side of the ball as corresponding to the actual ambient lighting. For example, when it is determined that actual ambient lighting is on the left side of the ball, the present system and process allows a user to add a virtual light source to provide ambient lighting to the left side the image that would render the ball to include more light on the left side of the ball and more shading or shadow on the right side of the ball. This provides an immersive experience as previously explained where ambient lighting, after capture and during viewing, provides its effect to the image at the time of viewing.

In terms of implementation of the above example for virtual ambient lighting, image data form the actual ambient light source is collected and applied to create a virtual ambient light source that has an associated light profile that changes the light surrounding the ball, and by extension, changes the shading or shadow surrounding the ball as well. Such an implementation includes changing pixel properties in the area surrounding the ball or adding an overlay with variations to the transparency or opaqueness as corresponding to the lighting or shadowing over the ball. In an example using an overlay, when a user or application of the computing device 720 attempts to add virtual ambient lighting, an overlay for the graphical elements or representations of the objects is provide on the graphical elements or representations of the objects. The overlay will appear as a part of the original image and will include the proper lighting and/or shading as that graphical element in the original image would be lighted by when it is an actual object, exposed to an actual ambient light source, and in an actual setting. When the representation of an object is not a captured image, but a rendered image, such as an element of a video game or media file, the position of the light source can be used to light and/or shade the representation of the object such that the representation of an object appears more realistic. Various other applications and services can utilize the determined position of a light source for other purposes as well, as discussed and suggested elsewhere herein.

Figure 8A:
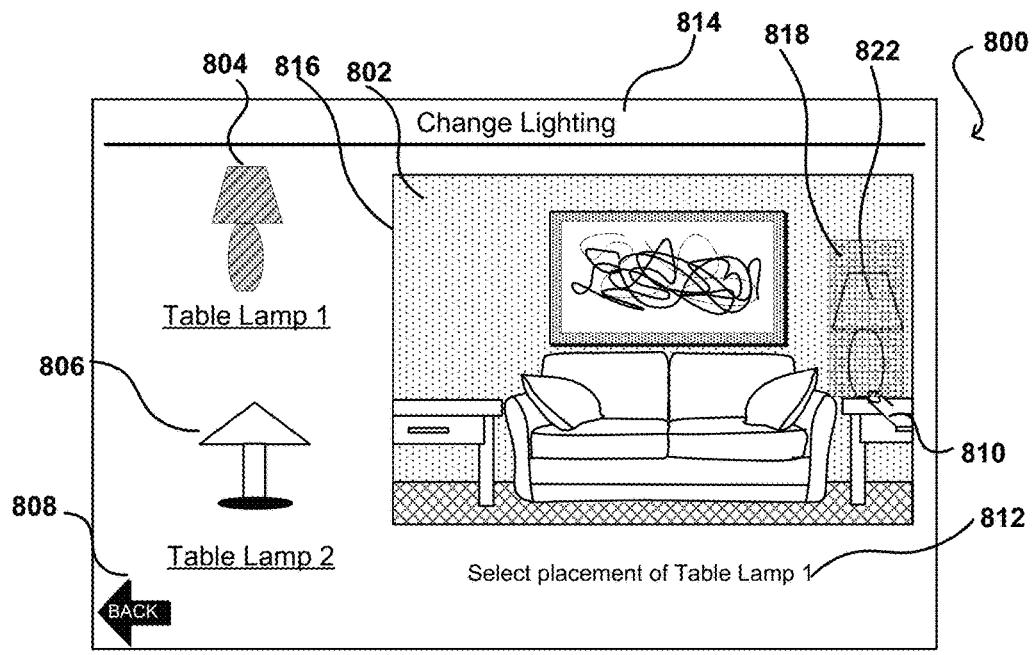
Figure 8B:
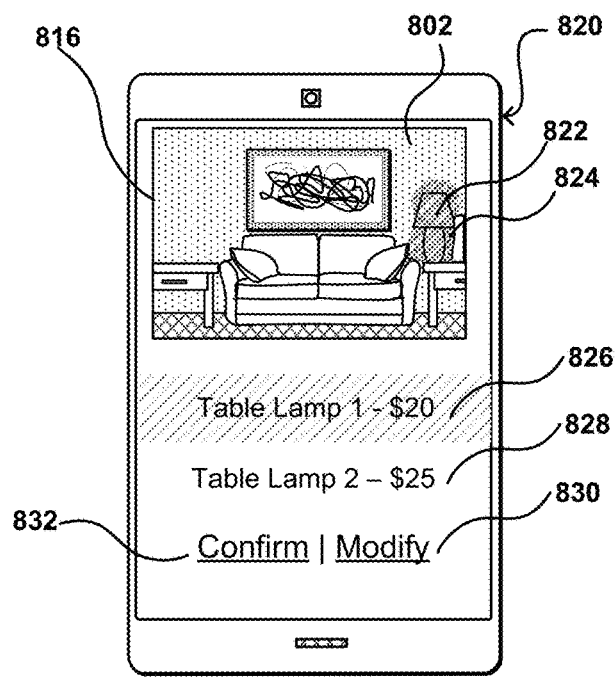

FIGS. 8A-8B provide further examples of an implementation, where a selected lamp 804, 822 is moved to a different location than in FIGS. 7A-7B. In an example of this implementation, the screen view 816 is a 3D environment that is represented using the 2D screen of a computing device 820. As illustrated in FIGS. 8A-8B, when the computing device is held steady at a first position, a relatively straightforward screen view of the 3D environment is rendered as a 2D view on the 2D screen. In the event that a different view is preferred during the live camera view or at a later time, a 3D extrapolation is provided using structural lighting. The structure lighting process includes projecting a regular pattern of light (e.g., infrared (IR) light) at a physical object and analyzing the changes in the reflected pattern due to 3D nature of the physical object. Once the reflected pattern is obtained, it is used to extrapolate the 2D image, along with the light and shadow information retrieved for the 2D image, to get a better view of the representations of objects displayed towards different angles on the screen or when those representations of the objects that are off-screen. In the case that the screen is supported by motion sensor hardware, a tilt of a user's head or the computing device is detectable to rotate the field of the screen view rendered for display and to provide an extrapolated 3D view.

In at least some embodiments, where the user rotates or tilts the computing device, the rendered image including shadows and/or lighting, will adjust accordingly. As the user tilts the device, the relative position of the light source can be tracked using the same detection approaches discussed elsewhere herein, which may be assisted (or replaced) at least in part by other elements, such as accelerometers, gyroscopes or inertial sensors. When the user tilts the device such that a side of an object is now "facing" the light source, that side might no longer be rendered in shadow, but might be fully lit due to the relative position of the light source. Other adjustments can be made as well, as appropriate.

The screen view on the screen shows an improved view of the representations of the objects as the user desires. Similarly, other views—up and down, or tilting, for example, are available in a similar manner as previous discussed. In the tilting process, the computing device 820 is titled forward to change the screen view 816 such that the screen view provides a point of view that better illustrates portions of the representations of the objects that were previously above a center point of the previous screen view. Further options that are available in the UI 800 and computing device 820, include moving the computing device 820 upward or downward to zoom in and out of the representations of the objects depicted in the screen. Accordingly, a user can change a point of view used to display the representations of the objects by generating input through user and/or device motion. Additionally, in embodiment, once the screen view is displayed in an altered manner so that portions of the screen view 816 are changed, the computing device 820 includes an option to receive an input for normalizing or adjusting the displayed image so that the displayed area of interest is reoriented to the center of the displayed image (e.g., keeping the lamp 822 in focus, at the center of the screen). This allows the relative orientation between the user and the computing device 820 and to return to a normal perpendicular viewing orientation, if required. Further, in alternative embodiments, orientation and reorientation of the computing device 820 can be selected using a cursor or touch screen, button selection or gesture, among other possibilities.

In the example UI of FIGS. 8A-8B, an illusion in the manner of FIGS. 7A-7B is provided. A user interacts with lighting options as the user would in selecting a physical lighting option for a physical room or building. Screen views 816, therefore, mimics the physical world addition in allowing a user to add lighting options to a live camera view, image, video 816. This becomes an immersive 3D environment to enhance the user's experience. Accordingly, in the example embodiment of FIG. 8A, the selected lamp 804, 822 is moved to the right side representation of the table. As in the prior implementations, the use of a finger 810 or a pointer is applicable to move the lamp 822 to the table. The unselected lamp 806 remains without highlighting. The selectable back option 808 provides the user with an option to go back to selecting the placement of the lamp 822 (as in UI 700 and its corresponding discussion), and further back to selecting from lamps 804, 806 (as in UI 600 and its corresponding discussion). Ambient lighting 802 reflects the same ambient lighting 702 from FIG. 7. A person of ordinary skill would recognize that a camera sensor may limit the light information captured from the ambient lighting in a room, for instance, but for purposes of this disclosure, the ambient lighting 802 is representative of the ambient lighting in a view or scene, such as, of a room.

Further, the change to the screen view is when the lamp 822 is released at a different placement than in FIGS. 7A-7B, for instance. Once the lamp 716 is positioned, the informative or clickable section 812 provides a clickable option to preview lighting from lamp 1, as it did in the case of reference numeral 712 in FIG. 7A. Pertinently, as a result, FIG. 8B illustrates the interface on the computing device that results from selecting the preview lighting in the new placement for lamp 822. FIG. 8B provides the preview lighting 824 surrounding the right side table, and which is illustrated as shading that is different than ambient lighting 802 to reflect. The difference is merely illustrative, but in actual implementation, the lamp 822 provides lighting as per its lighting profile to the live camera view, image, or video. The lighting 824 from lamp 822 is different than the ambient lighting in that area (as compared to the representation of the table in FIG. 7A, for instance). Once the user is satisfied with the lighting and choice of lamp—e.g., illustrated as the informative or clickable sections 826, 828, for purchasing the selection, the user may choose to confirm or modify the selection. In the event the user chooses to modify the lighting selection, via clickable section 830, the user is sent back one or more UI screen views—e.g., as in UIs 800, 700, or 600. When the user confirms the selection, via clickable section 832, the purchase is effected using stored account information or newly entered information for the user.

Figure 9A:
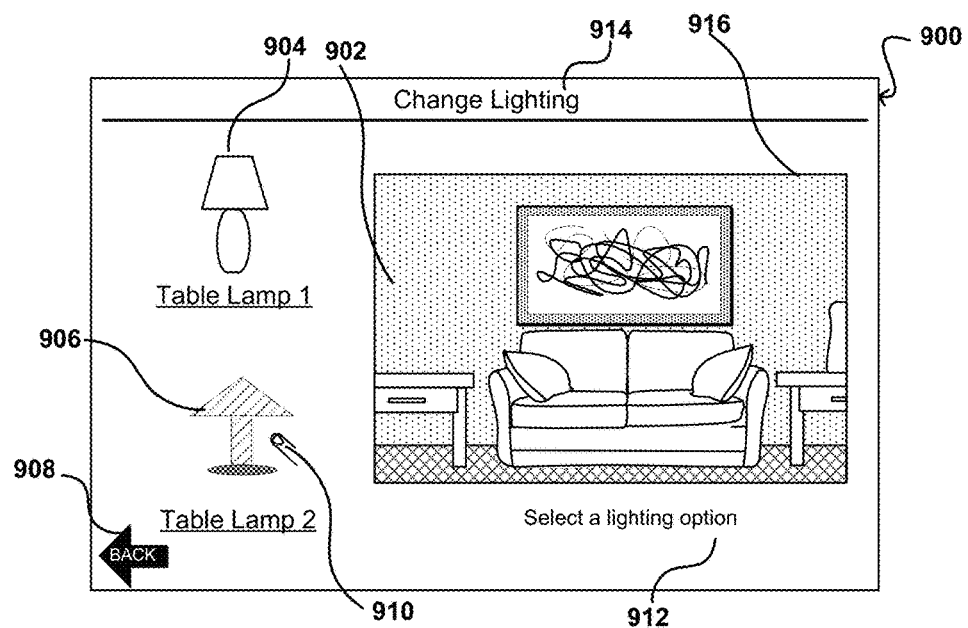
Figure 9B:
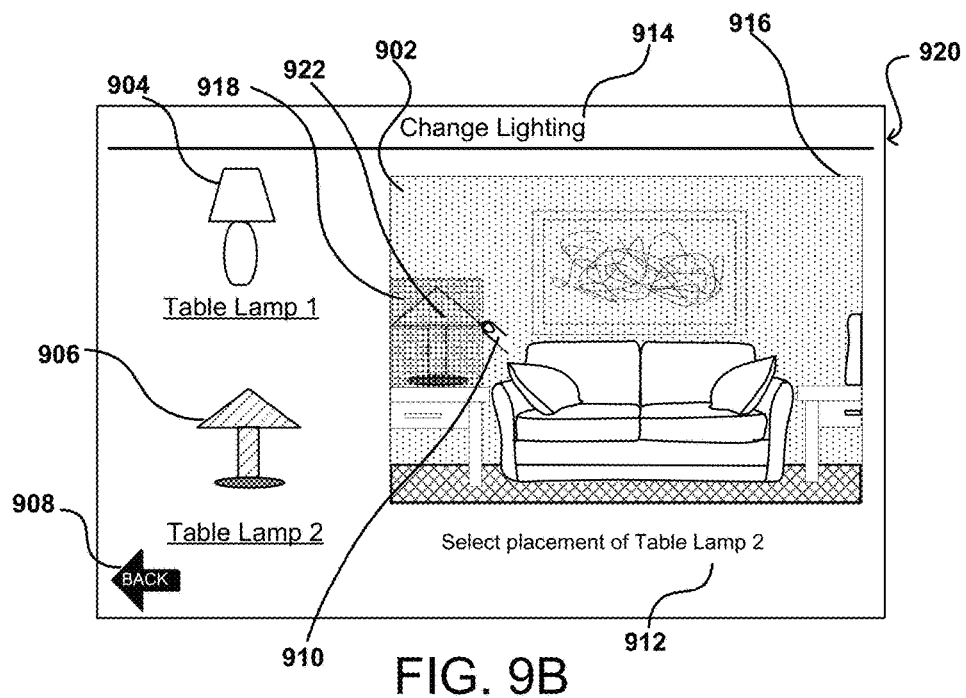

FIG. 9A-9B illustrates an example UI 920 in which a user selects Table Lamp 2 906, instead of Table Lamp 1 904 in the change lighting option 914 of an electronic marketplace application. In such a situation, the lamp 906 is highlighted as the selected lamp. The other lamp 904 remains unselected. Ambient light 902 remains as in the case of the previous example UIs 700 and 800 in FIGS. 7A and 8A. Finger 910 via touchscreen or a pointer is applicable to make the selection of the lamp 906 over lamp 904. As in the case of the prior example UIs, the informative or clickable section 912 provides an informative or a clickable section 912 requesting the user to select a lamp for preview on the screen view 916 and to purchase in a subsequent UI—as illustrated in FIGS. 7B and 8B.

FIG. 9B provides an example UI 920 to select placement of the lamp 906. A movable representation of the lamp 922 is provided with virtual box 918 to indicate that the lamp 922 is movable to a desired location in the screen view 916, representing the live camera view, image, or video. For example, a finger 910 or a pointer is available to move the lamp 922 to a desired location—e.g., one of the tables in the screen view 916. Once the placement is determined and the finger 910 or pointer is released the virtual box 918 is removed and the lamp 922 is plainly visible—similar to the representation for lamp 722 in FIG. 7A. Further, a clickable section appears instead of informative section 912, and the clickable section provides the user an option to touch to preview the lighting effect of lamp 922 on the representations of objects in the screen view 916. This is further detailed with respect to FIGS. 10A-10B.

Figure 10A:
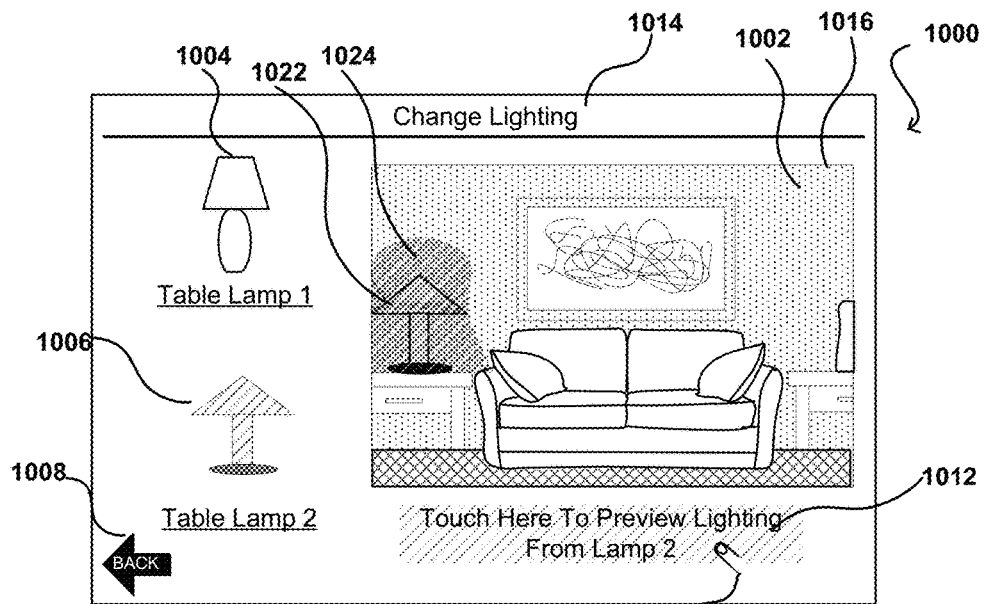
Figure 10B:
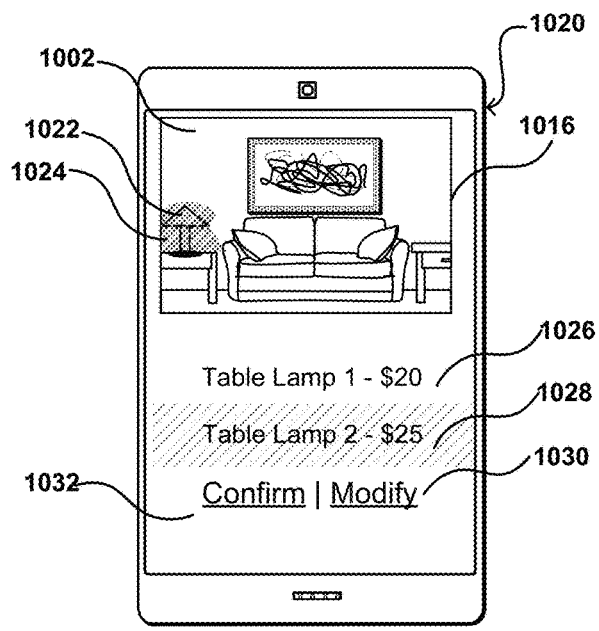

In the example UIs of FIGS. 10A-10B, a similar addition of a lighting source to the representations of objects, as in FIGS. 7A-7B, is illustrated. A different light source, i.e., lamp 1006 is selected for the addition in FIGS. 10A-10B, instead of lamp 1004, as in FIGS. 7A-7B. Pertinently, the application of a preview for lighting from the light source changes the light surrounding one or more of the representations of the objects in screen view 1016. A user interacts with lighting options as the user would in selecting a physical lighting option for a physical room or building. Screen views 1016 of FIGS. 10A-10B, therefore, mimic a physical world addition of lighting to a room by allowing a user to add lighting options to the screen views 1016, which represents a live camera view, an image, or a video. The addition of lighting, in an example, provides an immersive 3D environment to enhance the user's experience. Alternatively, the addition of the lighting options to the screen view provides a 2D view that changes the surrounding lighting of representations of objects in proximity to the placement of the lighting option. Accordingly, in the example embodiment of FIG. 10A, the selected lamp 1006, 1022 is placed on the left side representation of the table. As in the prior implementations, the use of a finger 810 or a pointer is applicable to move the lamp 822 to the left side table. The unselected lamp 1006 remains without highlighting. The selectable back option 1008 provides the user with an option to go back to selecting the placement of the lamp 1022 (as in UI 700 and its corresponding discussion), and further back to selecting from lamps 1004, 1006 (as in UI 600 and its corresponding discussion). Ambient lighting 1002 reflects the same ambient lighting 702 from FIG. 7. A person of ordinary skill would recognize that a camera sensor may limit the light information captured from the ambient lighting in a room, for instance, but for purposes of this disclosure, the ambient lighting 1002 is representative of the ambient lighting in a view or scene, such as, of a room.

Further, the change to the screen view 1016 is when the lamp 1022 is released at a desired placement. Once the lamp 1022 is positioned, the informative or clickable section 1012 provides a clickable option to preview lighting from lamp 2 1006. Pertinently, as a result, the UI 1000 in FIG. 10A or the UI of 10B is provided as the interface on the computing device. The example UIs in FIGS. 10A-10B provides the preview lighting 1024 surrounding the left side table, and which is illustrated as shading that is different than ambient lighting 1002, and also different from the shading 724 in FIG. 7B. The shading, as used in the illustrates reflect preview lighting provided form the added light or lighting sources; i.e., lamps 1004 and 1006, for instance. The difference is shading, as in these illustrations, is therefore merely illustrative, but in actual implementation, the lamp 1022 provides lighting as per its lighting profile to the live camera view, image, or video of screen view 1016. The lighting 1024 from lamp 1022 is different than the ambient lighting in that area (as compared to the representation of the table in FIG. 7A, for instance). The lighting 1024 from lamp 1022 is also different than the lighting 724 in that area from lamp 722, illustrating different lighting profiles for different types of lamps. Once the user is satisfied with the lighting and choice of lamp—e.g., illustrated as the informative or clickable sections 1026, 1028, for purchasing the selection of lamp, the user may choose to confirm or modify the selection. In the event the user chooses to modify the lighting selection, via clickable section 130, the user is sent back one or more UI screen views—e.g., as in UIs 800, 700, or 600. When the user confirms the selection, via clickable section 1032, the purchase is effected using stored account information or newly entered information for the user.

Figure 11:
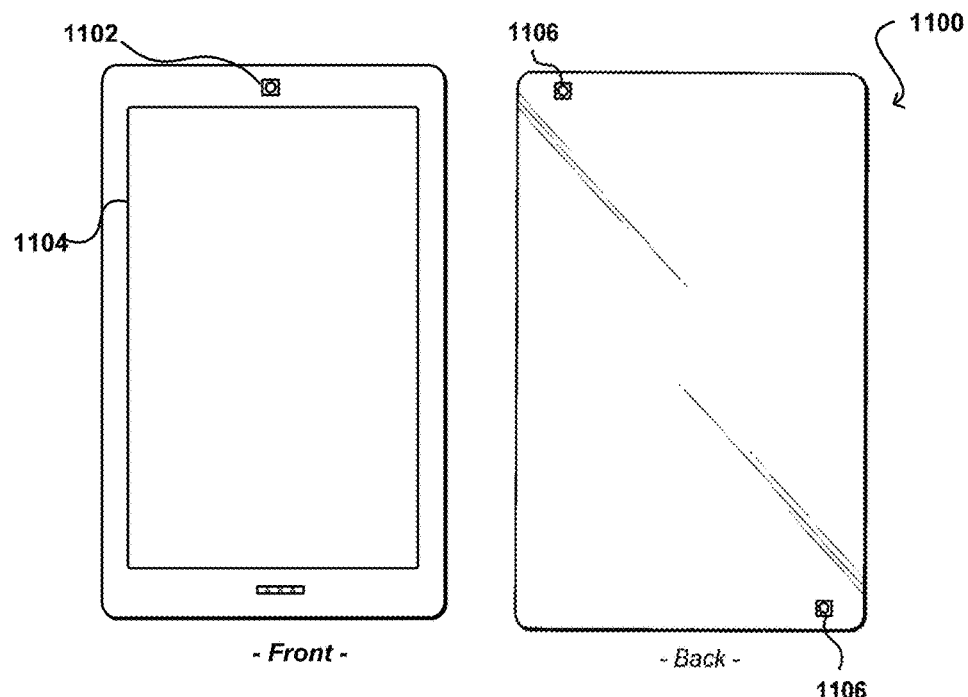
FIG. 11 illustrates an example of a computing device that can be used in accordance with various embodiments.
Figure 12:
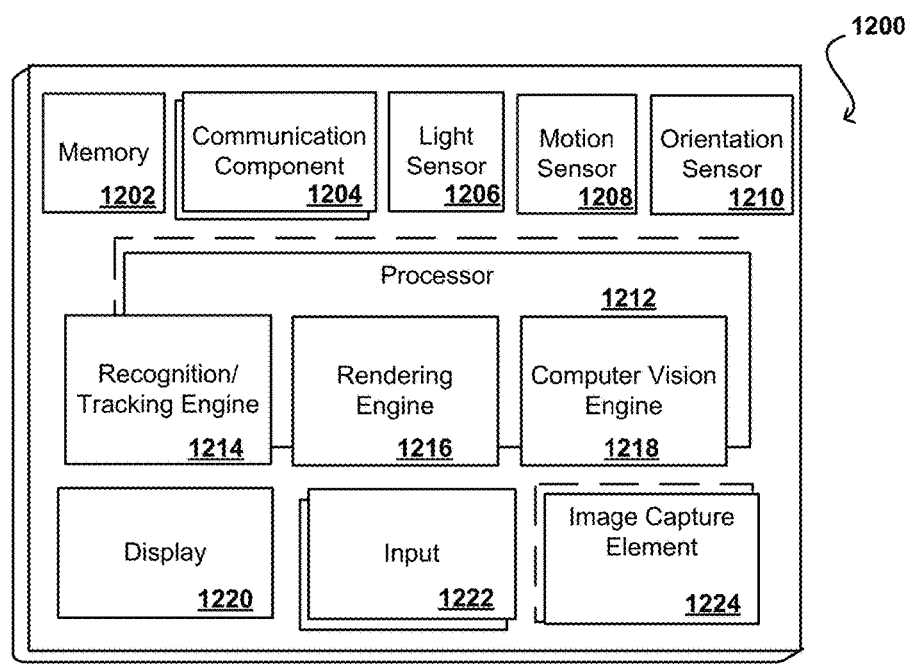
FIG. 12 illustrates an example configuration of components of the example computing device illustrated in FIG. 11.

FIG. 11 illustrates an example of a computing device 1100 (in the front and back views) that is available for use in accordance with various embodiments. Screen 1104 is provided to display the various UIs in the various embodiments above. Computing device 1100 includes a front facing camera 1102 for interfacing with the UIs, but also, and preferably, includes one or more back facing cameras (e.g., reference numerals 1106) that interfaces with the UI for performing the various embodiments herein. FIG. 12 illustrates an example configuration of components 1202-1224 of an example computing device 1200, such as computing device 1100 illustrated in FIG. 11. Components 1202-1224 are a set of basic components for the computing device 1100, but alternative or different arrangements are applicable without changing the features in the embodiments above. In the example of FIG. 11, the computing device 1200 includes at least one processor 1212 for executing instructions that can be stored in a memory device or element 1202. As would be apparent to one of ordinary skill in the art, upon reading this disclosure, that the computing device 1200 can include many types of memory, data storage or computer-readable media, such as a first data storage for program instructions for execution by the processor 1212. The same or separate storage can be used for images or data, and a removable memory can be available for sharing information with other devices. Further, any number of communication approaches can be available for sharing the information with other devices. Furthermore, it would also be apparent to one of ordinary skill, upon reading this disclosure, that processor 1212 may be multiple processors, each with processing tasks for the embodiments here, and may collectively act as a processor for the embodiments herein.

The computing device 1200 includes at least one type of screen or display element 1220, such as a touch screen, electronic ink (e-ink), organic light emitting diode (OLED) or liquid crystal display (LCD), although devices such as portable media players might convey information via other means, such as through audio speakers. The computing device 1200, in an example, also includes at least two image capture elements (illustrated as a single block 1224, with underlying blocks for more image capture elements, marked in broken lines). In an example, at least one image capture element 1224 is positioned to determine a relative position of objects in its frame of view. For example, the image capture element 1224 is operable to image or capture image data from a user, people, or other viewable objects in the vicinity of the computing device 1200. As previously noted, the image capture element 1224 can include any appropriate technology, such as a CCD or CMOS image capture element having a sufficient resolution, focal range and viewable area, to capture an image of objects and ambient lighting as part of operating the computing device 1200. Methods for capturing images or video using an image capture element with a computing device are known in the art, upon reading this disclosure. Further, it is generally understood, from this disclosure, that image capture can be performed using a single image, multiple images, periodic imaging, continuous image capturing, image streaming, video, live camera view, etc. As discussed, IR imaging can also be used to locate and track features of a user.

When a computing device, e.g., the computing device 1200, has at least two sensors or image capture elements (e.g., reference numerals 1224) with each capable of making a projection direction determination for light sources, the information from the multiple sensors 1224 is used to determine a position of the light source in relation to the computing device 1200 in 3D. Such a process uses a distance, as well as a relative projection direction, of each light source for making such a determination of the relative position of the light source. Such an approach enables a 3D intensity model to be developed which can be used to render graphical elements, e.g., lighting sources like virtual lamps. In examples herein, the objects or elements being rendered or processed by the computing device 1200 is at some distance from the actual computing device (either physically or virtually). With knowledge of the position of the object relative to the light source, in three dimensions, the representation of the object or the graphical element is rendered by the computing device 1200 and is illuminated and/or shaded based on the projection direction of the light source relative to the object itself. This process, therefore, does not necessarily rely on the projection direction of the light source relative to the computing device 1200, but uses the actual object position relative to the actual light source.

Various other approaches can be used to determine the relative projection direction of a light source in accordance with other embodiments. For example, a computing device, e.g., the computing device 1200, can utilize a number of different light paths to obtain intensity information from various directions for the intensity model in the light profile of a lighting source. With an analysis of the relative intensity from each direction, the computing device 1200 can generate a 3D lighting model, or at least determine the approximate direction of at least one light source. The paths can be provided using any appropriate element, such as optical fibers or transmissive apertures.

Further, although the above-described light paths are along a plane for an object, it should be understood that the light paths can form a 2D array that is available from which to capture light for a semi-hemispherical range of angles and direct the light to a 2D array of pixels (e.g., for a VGA chip) or other such configuration of the sensor 1206 or 1224. With an approach similar to that discussed throughout this disclosure, a computing device 1200 can determine the relative intensity for each light path and can use that information to develop a 3D intensity model for a light source. In at least an example embodiment, there are more than one sensor/light path elements positioned about the computing device 1200 in order to capture light information from substantially any direction around the computing device 1200. When the light paths provide sufficient angular range, the computing device 1200 can have two arrays on opposing sides and develop a reasonable model. The light paths can be substantially the thickness of the casing of the computing device 1200, and thus only primarily the size of the sensor 1206, 1218 (and any electronic paths or connectors) is added to the interior of the computing device 1200.

The computing device 1200 additionally includes at least one orientation sensor 1210, such as an accelerometer, digital compass, electronic gyroscope or inertial sensor, which can assist in determining movement or other changes in orientation of the device. The device can include at least one additional input device 1222 that is available to receive conventional input from a user. This conventional input can include, for example, radio-communications type wand devices, hand or gesture sensors, a push button, touch pad, touch screen, wheel, joystick, keyboard, mouse, trackball, keypad or any other such device or element whereby a user can input a command to the device. The conventional input, in one example, interfaces with the UI to move pointers or indicators on the UI, as in the case of pointer 316 in FIG. 3C. One more of the additional input device 1222, in an example, is connected to the computing device 1200 by a wireless IR or Bluetooth® or other link. In an embodiment, computing device 1200 might not include any buttons at all and might be controlled only through a combination of visual and audio commands such that a user can control the computing device without having to be in contact with the computing device.

Furthermore, the computing device 1200 includes, in another example, communication component 1204 representing various communication features for the computing device to commute with near and far devices. For example, using Bluetooth®, Wi-Fi®, and other communication protocols. A light sensor 1206 and a motion sensor 1208 are provided to enable the computing device to be used in various lighting environments and to enable the computing device UI to be controller by movement gestures as discussed with respect to FIGS. 3A-3C, for instance. A recognition and tracking engine 1214 is provided to track a user and vary the lighting effects from an added light source to the screen view when the computing device is moved. A rendering engine 1216 is provided to render 3D perspectives of the graphical elements discussed with respect to FIGS. 7A-7C, when it is required to provide virtual light sources for the screen view.

In an example, the computing device 1200 uses the light sensor 1206 to determine whether the device is exposed to ambient light or is in relative or complete darkness. Such a light sensor 1206 is beneficial in a number of ways to provide an accurate light profile for a light source, but also to accurately capture lighting and shadowing conditions in a live camera view, an image, or a video captured by a camera 1224. For example, the light sensor 1206 is applicable to determine when a lighting source is being sought to provide better lighting than is presently in an image capture frame.

In an implementation, any pair of cameras 1106 that have at least a partially overlapping field of view, is used to provide 3D imaging by capturing image information for one or more objects from two different perspectives or points of view, and combining the information to produce a 3D image. Such processes are useful in the above embodiments, where the lighting effect is desired to be viewed in different angles than a 2D view point. Example approaches include calculating an amount of disparity through a process such as edge matching, feature location and matching, color matching, and/or texture matching, and combining the disparity information with color information from each perspective to generate a three-dimensional image, either before or at a time of display. For example, if the image data is matched then the image data can be combined and/or displayed directly on a 3D-capable display, where the human brain can effectively do at least some of the 3D processing. In other examples, the image data can be otherwise combined or processed at the time of display such that upon displaying the image data, a 3D image is generated. A person of ordinary skill would recognize, with the present disclosure, that 3D image data can be used for other purposes or for further processing, such that using the image data to generate and display a 3D image is not required. For example, the image data can be used to determine shape and/or relative position information for various computer vision techniques, such as for determining one or more viewpoint and scale invariant feature descriptors used for object recognition and/or tracking. For the computer vision techniques above, a computer vision engine of processor 1212 is applicable to decrease the burden on the processor 1212 by executing specific algorithms as detailed above.

In a further example implementation, motion sensor 1206 is configured to provide motion input to the UI using a user's face (e.g., eyes) to determine various aspects useful for determining relative orientation. The front camera includes, in an example, the features for the motion sensor 1206 to track a user's eye. Once the user's eye is tracked, an algorithm is processed to place a virtual box around an object of the representations of the objects in the screen view. The position and/or size of this box is continually updated and monitored in order to monitor relative user position. Similar algorithms can also be used to determine an approximate location and area of each of the user's eyes (or in some cases the eyes in tandem). In determining the location of the user's eyes, the processor 1212 can determine the view position of the user's head, and can determine that the user is facing the device. Further, the relative movement of the user's eyes can be easier to detect than the overall movement of the user's head when performing motions such as nodding or shaking the head back and forth. Monitoring the virtual box size also helps to provide distance information as well as directional information, which can be helpful when generating a 3D version of the captured image, live camera view, or video.

Once the positions of facial features of a user are identified, relative motion between the user and the device can be detected and utilized as input. For example, the UI of the above embodiments interfaces with the computing device and the movement of the user's head in an up and down movement, with respect to the viewable area of the image capture element, e.g., front facing camera 1102. As discussed, this could be the result of the user moving his or her head, side to side, or the user moving the device up and down (and further, side to side). Each of these movements are tracked, in an example, as a vertical or horizontal movement, respectively, and each can be treated differently as an input to provide a realistic view point for the live camera view, image, or video. As should be understood, such a process also can detect diagonal or other such movements. Further, the computing device, with the present disclosure, can also distinguish between different users using the eye information, at least.

As mentioned, various embodiments include tracking of one or more objects of interest in three-dimensional space. With the third dimension image data, i.e., depth, distance, or disparity, from at least a pair of 2D images, object tracking can be less sensitive to factors such as shadows, lighting changes, and camera dynamics. Depth, disparity, or distance information can also optimize object tracking. As the relative sizes of an object's features are known, the computational expense of searching over scales can be minimized and the probability of false detections may be reduced since the search space is decreased. Depth, distance, or disparity, in an example, is applied to obtain shape and size information that can help to differentiate among foreground objects for improved tracking. Further, the previously described occlusions is more easily detected and handled more explicitly when more 3D information is available. Depth, distance, or disparity also provides at least another disambiguating dimension that can help to improved tracking.

Figure 13:
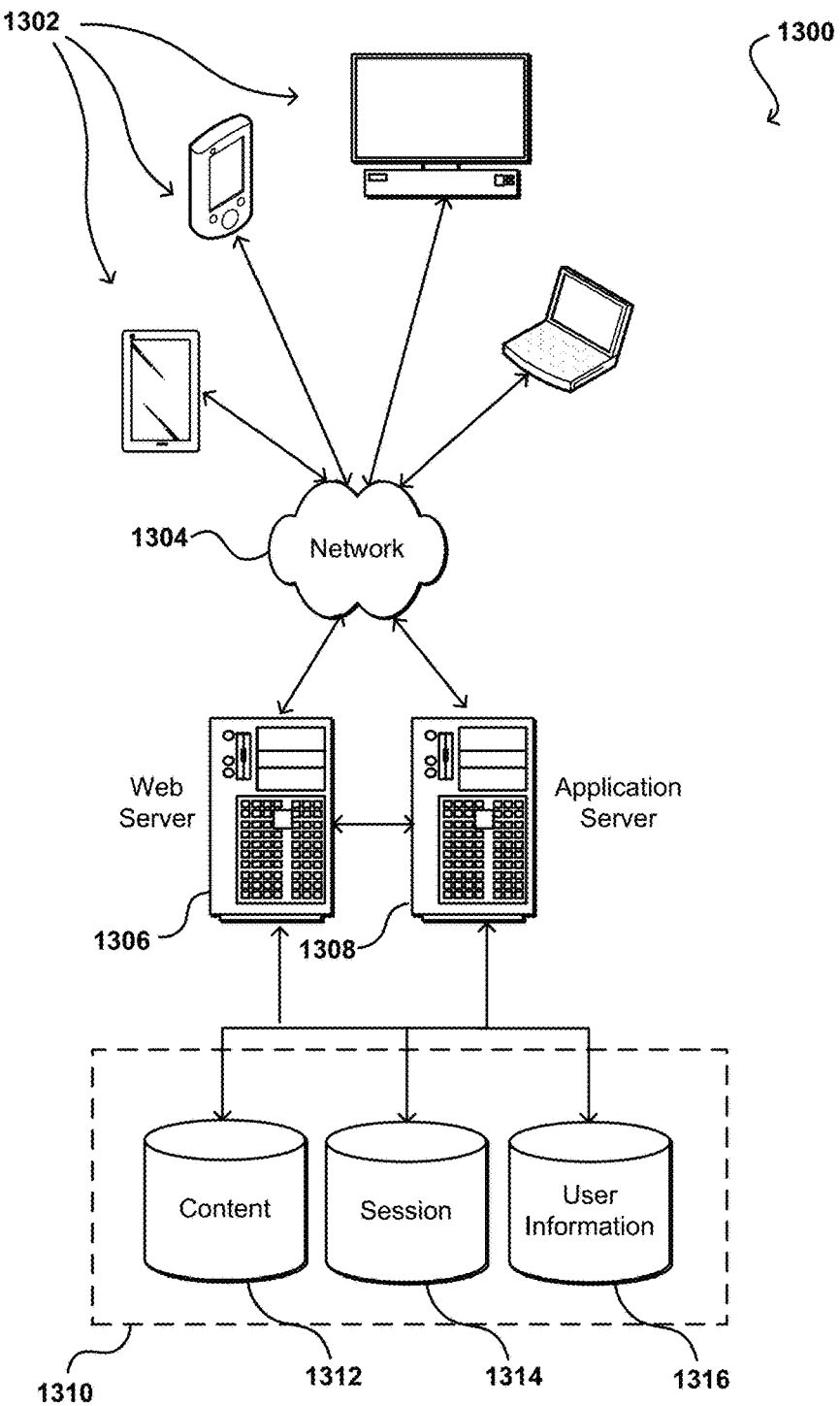
FIG. 13 illustrates an example configuration of a network architecture that can be used in accordance with various embodiments.

As discussed, different approaches can be implemented in various environments in accordance with the described embodiments. For example, FIG. 13 illustrates an example of an environment 1300 for implementing aspects in accordance with various embodiments. As will be appreciated, although a web-based environment is used for purposes of explanation, different environments may be used, as appropriate, to implement various embodiments. The system includes computing devices 1302, which can include any appropriate communications component (e.g., reference numeral 1204 of FIG. 12) operable to send and receive requests, messages or information over an appropriate network 1304 and convey information back to a user of the appropriate computing device 1302. Examples of such computing devices 1302 include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof Components used for such a system can depend at least in part upon the type of network and/or environment selected. Protocols and components for communicating via such a network are well known and will not be discussed herein in detail. Communication over the network 1304 can be enabled via wired or wireless connections and combinations thereof. In an example, the network 1304 includes the internet, as the environment includes a web server 1306 for receiving requests and serving content in response thereto, although for other networks, an alternative device serving a similar purpose could be used, as would be apparent to one of ordinary skill in the art.

The illustrative environment includes at least one application server 1308 and a data store 1310. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device and handling a majority of the data access and business logic for an application. The application server provides access control services in cooperation with the data store 1310 and is able to generate content such as text, graphics, audio and/or video to be transferred to the user, which may be served to the user by the web server 1306 in the form of hypertext markup language (HTML), extensible markup language (XML), or another appropriate structured language in this example. The handling of all requests and responses, as well as the delivery of content between a computing device 1302 and the application server 1308, can be handled by the web server 1306. It should be understood that the web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing content (e.g., production data) 1312 and user information 1316, which can be used to serve content for the production side. The data store is also shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a web page that the user is able to view via a browser on the user device 1302. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

In a further use case, using FIG. 13, a user views video captured by a first device (e.g., one of reference numeral 1302) using a second device, where both devices are connected over a network 1304, such as the Internet. The first device is configured to determine and communicate relative lighting information such that any image captured by the first device and transmitted to the second device can include lighting information (e.g., as a lighting profile for ambient lighting at the time of the video capture) overlaid over the capture video. The included lighting information, in an example, is edits to lighten or shade according to the light surrounding the second device, as opposed to the first device. Such an approach can enable the user's computing device to overlay graphical elements over video from a first remote source that is shaded according to the lighting near that remote source (so the overlay shading matches the captured video).

In a similar use case, a video that was captured at a time in the past includes lighting information stored or associated with it (as metadata or part of a media file). Such lighting information is useful at a subsequent time point, when a user device can add graphical elements that are shaded according to the captured video time. For example, an electronic marketplace application might allow a user to add a light source to a video of a product. When the lighting information for an object in the video is determined as appropriate and is saved, any number of different users, at different times, could change the lighting information to match intended light sources placed into the video. In another example, when a camera is used to capture images or videos in the morning at a tourist site and when the same camera is also used at the same site in the afternoon, the images displayed to a user, from the morning visit, could be changed to render with the lighting and position of the sun in the afternoon. Here, the lighting and position of the sun in the afternoon is a stored as an ambient lighting profile for that site and that time (e.g., afternoon) and is available to the user or any user.

As discussed above, the various embodiments can be implemented in a wide variety of operating environments, which in some cases can include one or more user computers, computing devices or processing devices which can be used to operate any of a number of applications. User or client computing devices can include any of a number of general purpose personal computers, such as desktop or laptop computers running a standard operating system, as well as cellular, wireless and handheld devices running mobile software and capable of supporting a number of networking and messaging protocols. Such a computer is further enabled using the systems and methods (e.g., with software improvements) discussed throughout this disclosure. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

In a navigational or mapping use case of the present disclosure, the ability to shade an image based on current conditions can also improve the realism of the image. For example, an application might be able to approximate a relative position of the sun to a certain location, which can be used to render a 3D view of that location with appropriate lighting based on time of day, day of the month, etc. Such an approach, however, will not be able to compensate for changes such as cloudiness, other light sources, etc. A car electronic marketplace application, for example, may be able to use different environmental lighting information to change the captured lighting information. The mapping application, however, might provide a benefit of using the user's preferred lighting to overlay information over objects (e.g., buildings) being viewed by the computing device. In order to properly shade the image of the building, in one example, the present system and method adjusts the amount of light actually being received from the sun in the current direction. Further, there could be other light sources such as spotlights or stadium lighting that can significantly affect the appearance of the building, which can be captured by the device. In example implementations, information from a compass and a Global Positioning System (GPS®) is applied to assist in the lighting determinations. Pertinently, the GPS® is useful to obtain a primary direction of the sun at the current place, time and direction, even if the sun is blocked by clouds at the present time. Further, if the building is in the shade of a larger building, it can be desirable to shade the building accordingly even though the sun is out and facing a given side of the building.

In another implementation, determining a relative position, type of a light source, and a relative position of an object being lit by that light source enables a 3D model of an environment including the object, around a user's computing device. When the computing device has more than one camera that is available to image the object, or has a stereoscopic camera or other such element, the computing device captures 3D information about the object being imaged. For example, the computing device captures information about the profile of the object, in addition to its shape from a direct view of the object. Thus, not only can the computing device light the object from a position corresponding to the light source, when rendering, but can also light any graphical elements according to the actual shape of the underlying object. This information can be utilized with any appropriate graphics program, such as by submitting the information as a request to an Open Graphics Library (GL) Application Programming Interface (API), whereby the appropriate lighting and shading can be performed using the 3D information.

Most embodiments utilize at least one network that would be familiar to those skilled in the art for supporting communications using any of a variety of commercially-available protocols, such as Transmission Control Protocol/Internet Protocol (TCP/IP), Open Systems Interconnection (OSI), File Transfer Protocol (FTP), Universal Plug and Play (UPnP), Network File System (NFS), Common Internet File System (CIFS), and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl®, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, electrically erasable programmable read-only memory (EEPROM), flash memory or other memory technology, compact disc-read only memory (CD-ROM), digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   a processor;
   a screen;
   a camera; and
   memory including instructions that, when executed by the processor, cause the processor to:
   receive image data of a live camera view from the camera, the image data including light information associated with a representation of an object;
   apply the light information to determine a first lighting profile associated with the representation of the object;
   determine position information associated with the object with respect to the camera;
   receive a second lighting profile associated with a light source, the second lighting profile providing at least intensity values and direction information for light projected from the light source, the second lighting profile being previously captured and stored in a database;
   determine changes to the first lighting profile to affect a light surrounding the representation of the object using the second lighting profile, wherein the changes affect the light surrounding the representation of the object by changing a portion of the image data that relates to areas surrounding the representation of the object; and
   displaying an augmented reality view of the image data on the screen, the augmented reality view including the changes to the first lighting profile.

2. The system of claim 1, wherein the memory including instructions that, when executed by the processor, further cause the system to:
   applying the changes in the augmented reality view based at least in part on applying, to the light surrounding the representation of the object, a lighting, a shading and a glint change.

3. The system of claim 1, wherein the memory including instructions that, when executed by the processor, further cause the system to:
   determine a light type of the light source, the light type being one of a point light source or a non-point light source; and
   including the changes in the augmented reality view based at least in part on the light type being the point light source that is different than an alternate changes rendered based on the light type being the non-point light source.

4. The system of claim 1, wherein the memory including instructions that, when executed by the processor, further cause the system to:
   analyzing the light projected from the light source to determine an intensity model, the intensity model including information for the intensity values and the direction information of light paths projected from the light source as relative values that are relative to the camera.

5. A computer-implemented method, comprising:
   determining a first lighting profile associated with a representation of an object and position information for the object relative to a reference point;
   receiving a second lighting profile for a light source, the second lighting profile providing at least intensity values and direction information for light projected from the light source;
   determining changes to the first lighting profile to affect a light surrounding the representation of the object based in part on the second lighting profile; and
   displaying an augmented reality view of the representation of the object that includes the changes to the first lighting profile.

6. The computer-implemented method of claim 5, wherein the first lighting profile is received from a live camera view of the object, and wherein the second lighting profile is received from one or more stored versions of the light source captured in different ambient lighting environments.

7. The computer-implemented method of claim 5, further comprising:
   providing the augmented reality view of the representation of the object and the representation of the object for comparative display.

8. The computer-implemented method of claim 5, further comprising:

capturing image data using an image capture element at the reference point, the image data including one of video data or an image.

9. The computer-implemented method of claim 5, wherein the changes include at least one of lighting, shading, and glint changes.

10. The computer-implemented method of claim 5, wherein the light source is selected from a plurality of light sources, individual light sources of the plurality of light sources comprising different third lighting profiles that will differently change the first lighting profile than the second lighting profile.

11. The computer-implemented method of claim 5, wherein the image is part of an augmented reality view from the image capture element.

12. The computer-implemented method of claim 5, wherein the providing of the augmented reality view of the representation of the object is for display as part of an electronic marketplace application.

13. The computer-implemented method of claim 5, wherein the first lighting profile and the second lighting profile include information for at least one of: directions of light, colors of light, intensities of light, sources of light, and luminous flux of light.

14. The computer-implemented method of claim 5, wherein the determining of the first lighting profile is from the object at a time of capture of the representation of the object, and wherein the receiving of the second lighting profile is from a database comprising information for the light source.

15. A non-transitory computer-readable storage medium including instructions that, when executed by a processor, cause the processor to:
determine a first lighting profile for a representation of an object and position information for the object relative to an image capture element;
receive a second lighting profile for a light source, the second lighting profile providing at least intensity values and direction information for light projected from the light source;
determine changes to the first lighting profile to affect a light surrounding the representation of the object based in part on the second lighting profile; and
display an augmented reality view of the representation of the object that includes the changes to the first lighting profile.

16. The non-transitory computer-readable storage medium of claim 15, wherein the first lighting profile is based at least in part on first ambient lighting environment surrounding the object at a time of capture of the representation of the object, and wherein the second lighting profile is based at least in part on (a) one or more stored images of the light source captured in second ambient lighting environments and (b) one or more object positions relative to the image capture element for the object.

17. The non-transitory computer-readable storage medium of claim 15, wherein the instructions when executed further cause the processor to:
save the representation of the object as an original version and the augmented reality view of the representation of the object as an augmented version; and
display the original version and the augmented version, either concurrently or separately.

18. The non-transitory computer-readable storage medium of claim 15, wherein the instructions when executed further cause the processor to: provide the augmented reality view of the representation of the object and the representation of the object for comparative display.

19. The non-transitory computer-readable storage medium of claim 15, wherein the changes to the first lighting profile include at least one of lighting, shading, and glint changes.

20. The non-transitory computer-readable storage medium of claim 15, wherein the augmented reality view of the representation of the object is provided for display as part of an electronic marketplace application.

* * * * *